(12) United States Patent
Vagelos

(10) Patent No.: US 12,081,593 B2
(45) Date of Patent: *Sep. 3, 2024

(54) INTERNET OF THINGS SYSTEM AND PROCESS IMPLEMENTING A FILTER

(71) Applicant: TracFone Wireless, Inc., Miami, FL (US)

(72) Inventor: Theodore Vagelos, Miami, FL (US)

(73) Assignee: Tracfone Wireless, Inc., Miami, FL (US)

( * ) Notice: Subject to any disclaimer, the term of this patent is extended or adjusted under 35 U.S.C. 154(b) by 408 days.

This patent is subject to a terminal disclaimer.

(21) Appl. No.: 17/498,887

(22) Filed: Oct. 12, 2021

(65) Prior Publication Data

US 2022/0029960 A1    Jan. 27, 2022

Related U.S. Application Data

(63) Continuation-in-part of application No. 16/731,257, filed on Dec. 31, 2019, now Pat. No. 11,316,903, which is a continuation of application No. 15/183,070, filed on Jun. 15, 2016, now Pat. No. 10,523,711.

(Continued)

(51) Int. Cl.
H04L 9/40         (2022.01)
H04W 12/06    (2021.01)
H04W 12/08    (2021.01)

(52) U.S. Cl.
CPC .......... H04L 63/20 (2013.01); H04L 63/0227 (2013.01); H04L 63/0853 (2013.01); H04L 63/101 (2013.01); H04W 12/06 (2013.01); H04W 12/08 (2013.01)

(58) Field of Classification Search
CPC ............... H04L 63/20; H04L 63/0227; H04L 63/0853; H04L 63/101; H04L 63/0218; H04W 12/06; H04W 12/08

See application file for complete search history.

(56) References Cited

U.S. PATENT DOCUMENTS 5,987,611 A * 11/1999 Freund ................. H04L 43/00
726/4
6,606,659 B1   8/2003 Hegli et al.
(Continued)

OTHER PUBLICATIONS

Meng, Weizhi. "Intrusion detection in the era of IoT: Building trust via traffic filtering and sampling." Computer 51.7 (2018): 36-43. (Year: 2018).*

(Continued)

Primary Examiner — Syed A Zaidi

(57) ABSTRACT

A process of filtering a wireless service provided to at least one wireless device from a wireless network includes receiving identification of the at least one wireless device in a filtering server from an administrator and receiving filtering instructions from the administrator in the filtering server. The process further including receiving a request for an internet resource from at least one wireless device, comparing the request for the internet resource to the filtering instructions to determine whether the requested internet resource is allowable in view of the filtering instructions or not allowed based on the filtering instructions. The disclosure also provides a system as well.

19 Claims, 8 Drawing Sheets

Related U.S. Application Data

(60) Provisional application No. 63/090,352, filed on Oct. 12, 2020.

(56) References Cited

U.S. PATENT DOCUMENTS

| | | | |
|---|---|---|---|
| 7,249,175 B1 | 7/2007 | Donaldson | |
| 8,464,335 B1 * | 6/2013 | Sinha | G06F 21/51 |
| | | | 713/153 |
| 9,912,664 B1 | 3/2018 | Lam et al. | |
| 2003/0105863 A1 | 6/2003 | Hegli et al. | |
| 2003/0110168 A1 | 6/2003 | Kester et al. | |
| 2003/0154401 A1 | 8/2003 | Hartman et al. | |
| 2003/0196105 A1 | 10/2003 | Fineberg | |
| 2004/0255167 A1 * | 12/2004 | Knight | H04L 41/28 |
| | | | 709/224 |
| 2005/0009499 A1 | 1/2005 | Koster | |
| 2006/0021031 A1 | 1/2006 | Leahy et al. | |
| 2006/0165040 A1 | 7/2006 | Rathod et al. | |
| 2008/0104663 A1 | 5/2008 | Tokutani et al. | |
| 2008/0134282 A1 | 6/2008 | Fridman et al. | |
| 2008/0320577 A1 | 12/2008 | Larduinat | |
| 2009/0112722 A1 | 4/2009 | Williams | |
| 2013/0040629 A1 | 2/2013 | Sprigg et al. | |
| 2013/0297498 A1 | 11/2013 | Nazaret | |
| 2014/0089673 A1 | 3/2014 | Luna | |
| 2015/0135261 A1 * | 5/2015 | Park | H04L 63/102 |
| | | | 726/4 |
| 2015/0188949 A1 | 7/2015 | Mahaffey et al. | |
| 2015/0256545 A1 * | 9/2015 | Dotterer, III | H04L 67/10 |
| | | | 726/1 |
| 2016/0294775 A1 | 10/2016 | Mahadik et al. | |
| 2017/0180426 A1 * | 6/2017 | Mahadik | H04L 63/08 |
| 2017/0250870 A1 * | 8/2017 | Zhao | H04L 63/20 |
| 2018/0048668 A1 * | 2/2018 | Gupta | H04L 63/1425 |
| 2018/0255463 A1 * | 9/2018 | Zheng | G06F 9/45558 |

OTHER PUBLICATIONS

NPL Search Terms (Year: 2024).*

* cited by examiner

INTERNET OF THINGS SYSTEM AND PROCESS IMPLEMENTING A FILTER

CROSS-REFERENCE TO RELATED APPLICATIONS

This application is a continuation in part of U.S. patent application Ser. No. 16/731,257, filed Dec. 31, 2019, which application is incorporated herein by reference in its entirety; and which application is a continuation of U.S. patent application Ser. No. 15/183,070, filed Jun. 15, 2016 now U.S. Pat. No. 10,523,711 issued Dec. 31, 2019, which application is incorporated herein by reference in its entirety. This application additionally claims the benefit of U.S. Provisional Application No. 63/090,352 filed on Oct. 12, 2020, which is hereby incorporated by reference in its entirety for all purposes as if fully set forth herein.

BACKGROUND OF THE DISCLOSURE

1. Field of the Disclosure

This disclosure relates generally to an internet of things system implementing a filter. This disclosure also relates generally to an internet of things process implementing a filter. This disclosure further relates generally to an internet of things system implementing a network filter. This disclosure also further relates generally to an internet of things process implementing a network filter.

2. Related Art

The Internet of things (IoT) is a network of IoT objects embedded with electronics, software, sensors, actuators, and/or network connectivity which enable these IoT objects to connect and exchange data. The IoT allows the IoT objects to be sensed or controlled remotely across a network infrastructure, which provides direct integration of the physical world into computer-based systems resulting in improved efficiency, accuracy, and economic benefit in addition to reduced human intervention.

However, implementation of the IoT objects can be susceptible to hacking. In particular, the IoT objects can be susceptible to a person, system, device, and/or the like that may implement methods, systems, devices, and/or the like for hacking, for breaching defenses, for exploiting weaknesses, and/or the like in the IoT objects. For example, if the IoT objects (a) acquire malware and (b) the IoT objects connect to an unauthorized location, operation of the IoT objects may be compromised.

Accordingly, there is a need for a system and process to reduce the ability for the IoT objects to be hacked, limit any effectiveness of hacking of the IoT objects, and/or limit the ability for the IoT objects to be hacked.

SUMMARY OF THE DISCLOSURE

The foregoing needs are met, to a great extent, by the disclosure, with an internet of things filtering system and process.

One aspect includes a process of filtering a wireless service provided to at least one wireless device from a wireless network for an individual of a company, the process that includes implementing a filtering server in at least one of a mobile virtual network operator cloud and a mobile network operator implementing the wireless network; receiving identification of at least one wireless device in the filtering server from an administrator of a company; receiving filtering instructions from the administrator in the filtering server; receiving a request in the wireless network for an internet resource from at least one wireless device; comparing the request for the internet resource to the filtering instructions with the filtering server to determine whether the request for an internet resource is allowable in view of the filtering instructions or not allowed based on the filtering instructions; providing the internet resource to the wireless device with the filtering server if the request for an internet resource is allowable based on the filtering instructions; and denying the internet resource to the wireless device with the filtering server if the request for an internet resource is not allowed based on the filtering instructions and sending an indication to the at least one wireless device that the request for an internet resource is not allowed, where the filtering instructions that includes at least one of the following: a white list of internet resources, a blacklist of internet resources, and categories of internet resources and a degree of content filtering based on said categories; where the receiving identification of the at least one wireless device in the filtering server from the administrator that includes receiving company identification information through a webpage generated by the filtering server; and where the filtering server is configured to search a database based on the company identification information to generate the identification of the at least one wireless device utilized by the company.

One aspect includes a wireless network system filtering a wireless service provided to at least one wireless device from a wireless network for an individual of a company that includes a filtering server configured to receive identification of at least one wireless device from an administrator of a company; the filtering server further configured to receive filtering instructions from the administrator the filtering server further configured to receive a request for an internet resource from at least one wireless device; the filtering server further configured to compare the request for the internet resource to the filtering instructions to determine whether the request for the internet resource is allowable in view of the filtering instructions or not allowed based on the filtering instructions; the filtering server further configured to provide the internet resource to the wireless device if the request for the internet resource is allowable based on the filtering instructions; and the filtering server further configured to deny the internet resource to the wireless device if the request for the internet resource is not allowed based on the filtering instructions and send an indication to the at least one wireless device that the request for an internet resource is not allowed, where the filtering server is implemented in at least one of a mobile virtual network operator cloud and a mobile network operator implementing the wireless network; where the filtering instructions that includes at least one of the following: a white list of internet resources, a blacklist of internet resources, categories of internet resources and a degree of content filtering based on said categories; where the receiving identification of the at least one wireless device in the filtering server from the administrator that includes receiving company identification information through a webpage generated by the filtering server, and where the filtering server is configured to search a database based on the company identification information to generate the identification of the at least one wireless device associated with the company.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
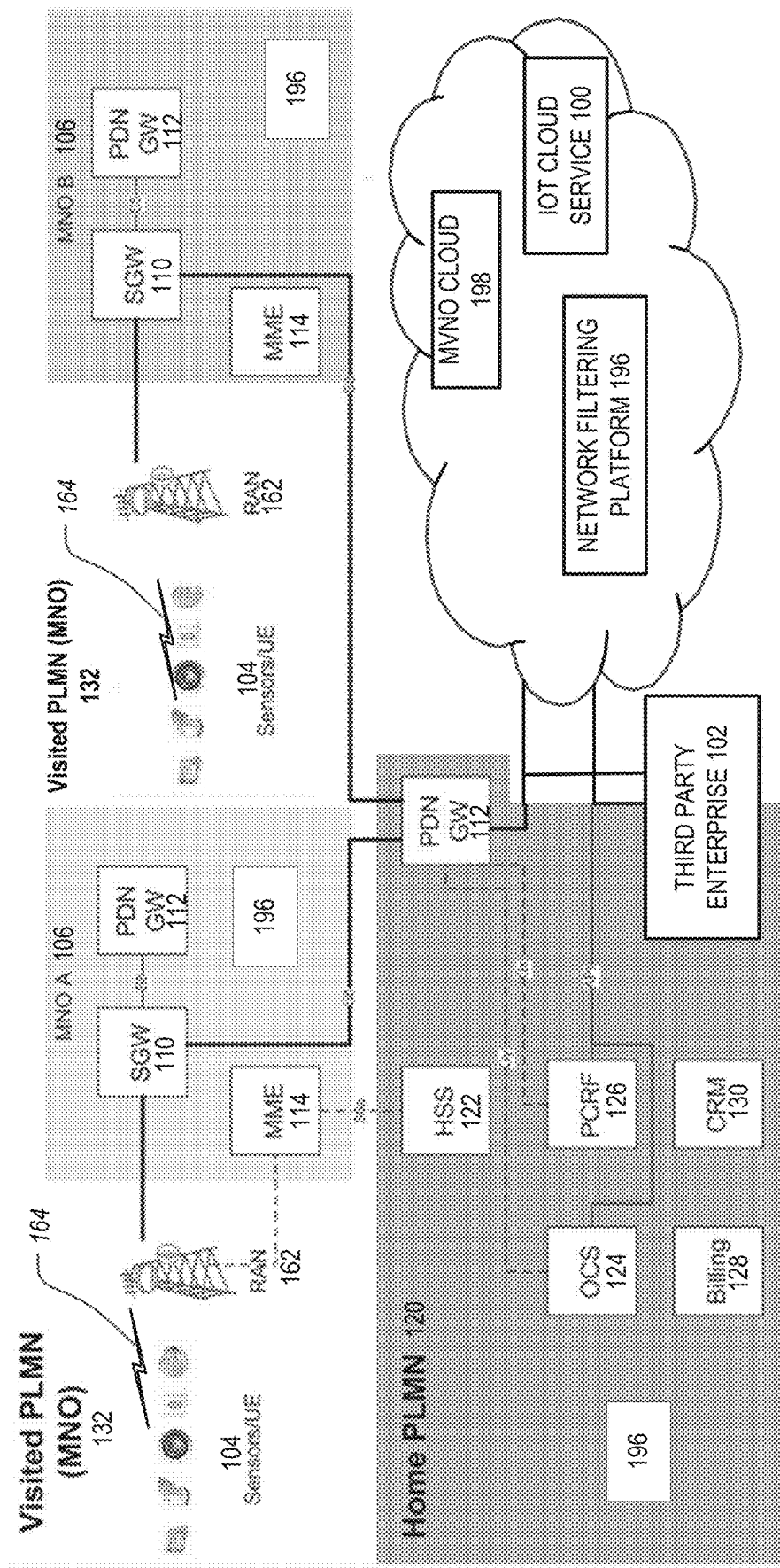
FIG. 1 illustrates an exemplary IoT system with associated system components in accordance with aspects of the disclosure.

Reference in this specification to a "wireless device" is intended to encompass any compatible mobile technology computing device that connects to a wireless communication network, such as an IoT device, mobile phones, mobile equipment, mobile hotspots, wearable devices, mobile stations, user equipment, cellular phones, smartphones, handsets or the like (e.g., APPLE® IPHONE®, IPAD®, GOOGLE® ANDROID® based devices, BLACKBERRY® based devices, other types of PDAs or smartphones), wireless dongles, or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," "mobile hotspots," "wearable devices," or "phone." Further, reference in this specification to a "wireless network" or "network" is intended to encompass any type of wireless network from which a MVNO contracts with a MNO wireless carrier to provide mobile phone services through the use of a wireless device, such as the Global System for Mobile Communication (GSM) network, Code-Division Multiple Access (CDMA) network, 4G-LTE, 5G, a communication channel as defined herein, or the like, that may utilize the teachings of the present application to allow a wireless device to connect to a wireless network.

Reference in this specification to an IoT object or IoT device is intended to encompass any compatible mobile technology computing device that connects to a wireless communication network. The IoT device may be implemented as any physical device embedded with electronics, software, sensors, actuators, and/or network connectivity that enable these objects or devices to connect and exchange data, information, instructions, and/or the like. The IoT device may be implemented in a smart home, a wearable device, a smart city implementation, a smart grid implementation, an industrial implementation, a connected car implementation, a connected health related implementation, a smart retail implementation, a smart supply chain implementation, a smart farming implementation, and/or the like. The IoT device may be configured to sense, control, be controlled, and/or the like remotely across a wireless network infrastructure, creating opportunities for more direct integration of the physical world into computer-based systems, and resulting in improved efficiency, accuracy and economic benefit in addition to reduced human intervention.

The IoT device may connect to a "wireless network" or "network" and this connection is intended to encompass any type of wireless network to obtain wireless services for the use of the IoT device, such as the Global System for Mobile Communication (GSM) network, Code-Division Multiple Access (CDMA) network, GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (W-Fi), Bluetooth, a communication channel as defined herein, or the like, and/or a combination of two or more thereof, that may utilize the teachings of the disclosure to allow the IoT device to connect to a wireless network to exchange data.

Certain companies that provide wireless services, can be wireless carriers or Mobile Network Operators (MNOs) that maintain, operate, and control their own wireless networks and typically have control of their own frequency spectrum. An MNO relies heavily on backend systems to address any provisional, billing, security, and data issues that might threaten the health of their networks.

A Mobile Virtual Network Operator (MVNO) is a mobile operator that typically does not own its own frequency spectrum and typically does not have its own network infrastructure. Instead, MVNOs have business arrangements and contracts with third party wireless carriers (MNOs) to purchase usage of their networks (e.g., minutes of voice calls, volume of data transfer, number of SMS, service days, etc.) that the MVNOs in turn sell to their own customers. The disclosed internet of things filtering system and process may be utilized in relation to an MNO and/or a MVNO. However, implementations of the disclosed internet of things filtering system and process may have numerous benefits when implemented by a MVNO. In one aspect, implementations of the disclosed internet of things filtering system and process may have numerous benefits when implemented by a MVNO due to the multiple wireless carriers and/or multiple networks implemented by a MVNO. However, the disclosed internet of things filtering system and process may also be implemented by an MNO.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

FIG. 1 illustrates an exemplary IoT system with associated system components in accordance with aspects of the disclosure.

In particular, FIG. 1 shows an exemplary IoT system that may include, interact, communicate, connect, and/or the like with one or more of a plurality of wireless networks 106, one or more of a plurality of IoT devices 104, a network filtering platform 196, and a third-party enterprise 102. In one aspect, one or more of the plurality of wireless networks 106 may be implemented in wireless networks implemented at least in part by mobile network operators (MNOs). In one aspect, one or more of the plurality of wireless networks 106 may be provisioned and overseen by a mobile virtual network operator (MVNO). In this regard, the MVNO may implement a mobile virtual network operator (MVNO) cloud 198 in accordance with aspects of the disclosure. However, aspects of the disclosure are equally applicable to an IoT system utilizing a single wireless network implemented by an MNO, a non-MVNO implementation of an IoT system, and/or the like. In this regard, the network filtering platform 196 may be implemented by one or more of the plurality of wireless networks 106, the third-party enterprise 102, and/or the like.

As shown in FIG. 1, there are two wireless networks 106, wireless network 106 MNO A and the wireless network 106 MNO B. However, it is contemplated that any number of MNOs may be utilized by the IoT system. One or more of the plurality of wireless networks 106 may connect to a respective one of the plurality of IoT devices 104. Data, information, instructions, and/or the like are exchanged between one or more of the plurality of wireless networks 106 and one or more of the plurality of IoT devices 104 over a communication channel 164 as defined herein. For brevity, the data, information, instructions, and/or the like exchanged between the plurality of wireless networks 106 and the plurality of IoT devices 104 will be referred to as IoT data hereinafter. In other words, the IoT data may include data, information, instructions, IoT data, IoT information, IoT instructions, and/or the like.

A portion of the IoT data exchanged between the plurality of wireless networks 106 and the plurality of IoT devices 104 may be transmitted to the third-party enterprise 102. Moreover, a portion of the IoT data exchanged between the plurality of wireless networks 106 and the plurality of IoT devices 104 may be transmitted from the third-party enterprise 102. The third-party enterprise 102 may be an entity that desires to implement the functionality of the IoT devices 104. In particular, the third-party enterprise 102 may be an entity providing Internet of things functionality for a smart home, a wearable device, a smart city implementation, a smart grid implementation, an industrial implementation, a connected car implementation, a connected health related implementation, a smart retail implementation, a smart supply chain implementation, a smart farming implementation, and/or the like.

The network filtering platform 196 as described in greater detail below operates to filter, limit, control, and/or the like the communications and the exchange of data between the plurality of IoT devices 104 and the plurality of wireless networks 106. In this regard, the plurality of IoT devices 104 may be susceptible to hacking. In particular, the plurality of IoT devices 104 can be susceptible to a person or device that may implement methods for breaching defenses, exploiting weaknesses, and/or the like in the plurality of IoT devices 104. For example, if the plurality of IoT devices 104 were to (a) acquire malware and (b) the plurality of IoT devices 104 connect to an unauthorized location, operation of the plurality of IoT devices 104 may be compromised. In this case, malware may include computer viruses, worms, Trojan horses, ransomware, spyware, adware, rogue software, scareware, and/or the like. Accordingly, this filtering operation of the network filtering platform 196 operates to reduce hacking, to prevent hacking, to limit hacking, to limit an impact of hacking, and/or the like by preventing and/or reducing communications and the exchange of data between the plurality of IoT devices 104 and the plurality of wireless networks 106 that might be a result of hacking. Accordingly, the network filtering platform 196 provides increased efficiency, connectivity, control, proficiency, and/or the like to the plurality of IoT devices 104 and/or to the plurality of wireless networks 106.

The network filtering platform 196 may reside in the MVNO cloud 198, one or more of the plurality of wireless networks 106, the home Public Land Mobile Network (PLMN) 120, the third-party enterprise 102, may be standalone, and/or the like. The network filtering platform 196 may be implemented as a server, a computer, a system, a distributed processing system, a cloud-based system, and/or the like, or a plurality of the same. In one aspect, the network filtering platform 196 may utilize a network filtering client 298 on one or more of the plurality of IoT devices 104. In another aspect, the network filtering platform 196 may not require a client on one or more the plurality of IoT devices 104.

In one aspect, the network filtering platform 196 may be implemented as Software as a Service (SaaS). In one aspect, the SaaS may be implemented as a software licensing and delivery model in which software may be licensed on a subscription basis and may be centrally hosted. For example, centrally hosted in the network filtering platform 196. In one aspect, the SaaS implementation of the network filtering platform 196 may be accessed by users using a web browser. In this regard, the users may be administrators of a company implementing the IoT device 104, the third-party enterprise 102 implementing the IoT device 104, the MVNO cloud 198, the plurality of wireless networks 106, and/or the like. Reference in the specification to a "company" is meant to refer to any entity that is providing some administrative oversight to the IoT device 104 associated with the entity. Company can mean a manufacturer, a service provider, an organization, a government agency, a group of individuals, an organized body of people with a particular purpose, a business, a society, an association, and/or the like. Accordingly, reference to a company is for brevity only.

In further aspects, the SaaS implementation of the network filtering platform 196 may be accessed by users using a thin client via a web browser. In one aspect, the SaaS implementation of the network filtering platform 196 may be based on a multitenant architecture. In this aspect, a single version of the application with a single configuration may be implemented. The single configuration may include hardware, network, operating system, and the like for all users ("tenants"). To support scalability, the application may be installed on multiple servers and/or machines.

The MVNO cloud 198 may be implemented as a network, an internet cloud, a server, a computer, a system, a distributed processing system, a cloud-based system, and/or the like. The MVNO cloud 198 and/or the network filtering platform 196 may be responsible for one or more of filtering, provisioning, metering, and consolidating information, wireless service, and/or the like for the third-party enterprise 102, the plurality of wireless networks 106, and/or the like for the plurality of IoT devices 104. The MVNO cloud 198 and/or the network filtering platform 196 may be configured to implement the further functionality as described in further detail below. Alternatively or additionally, the disclosure may utilize a network filtering client 298 that may be associated, implemented, executed, and/or the like by the plurality of IoT devices 104.

FIG. 1 further illustrates an IoT cloud service 100. The IoT cloud service 100 of the disclosure as described in greater detail below provides increased efficiency, connectivity, control, proficiency, and/or the like for operation of the IoT device 104. In one aspect, the IoT cloud service 100 of the disclosure as described in greater detail below provides increased efficiency, connectivity, control, proficiency, and the like over multiple wireless carriers and/or multiple wireless networks. The IoT cloud service 100 may be implemented by one or more servers, processors, databases, a network, an internet cloud, a computer, a system, a distributed processing system, a cloud-based system, and/or the like. In one aspect, the network filtering platform 196 may be implemented by the IoT cloud service 100. In one aspect, the IoT cloud service 100 may be implemented by the network filtering platform 196. In one aspect, the IoT cloud service 100 and the network filtering platform 196 are implemented together.

One or more of the plurality of wireless networks 106 may include one or more of a radio access network (RAN) 162, a home Public Land Mobile Network (PLMN) 120, a Mobility Management Entity (MME) 114, a Signaling Gateway (SGW) 110, a home subscriber server (HSS) 122, a public data network (PDN) gateway (PDN GW) 112, an Online Charging System (OCS) 124, a Policy and Charging Rules Function (PCRF) 126, a billing component 128, a Customer Relationship Management (CRM) 130, and/or the like. In alternative or additional aspects, one or more of the plurality of wireless networks 106 may include a base transceiver station (BTS), a base station controller (BSC), a mobile switching center (MSC), and/or the like overseen by a network operator. Other types of wireless networks utilizing a communication channel as defined herein are contemplated as well. The wireless network 106 may communicate with the IoT device 104 over a communication channel 164 as defined herein.

Figure 2:
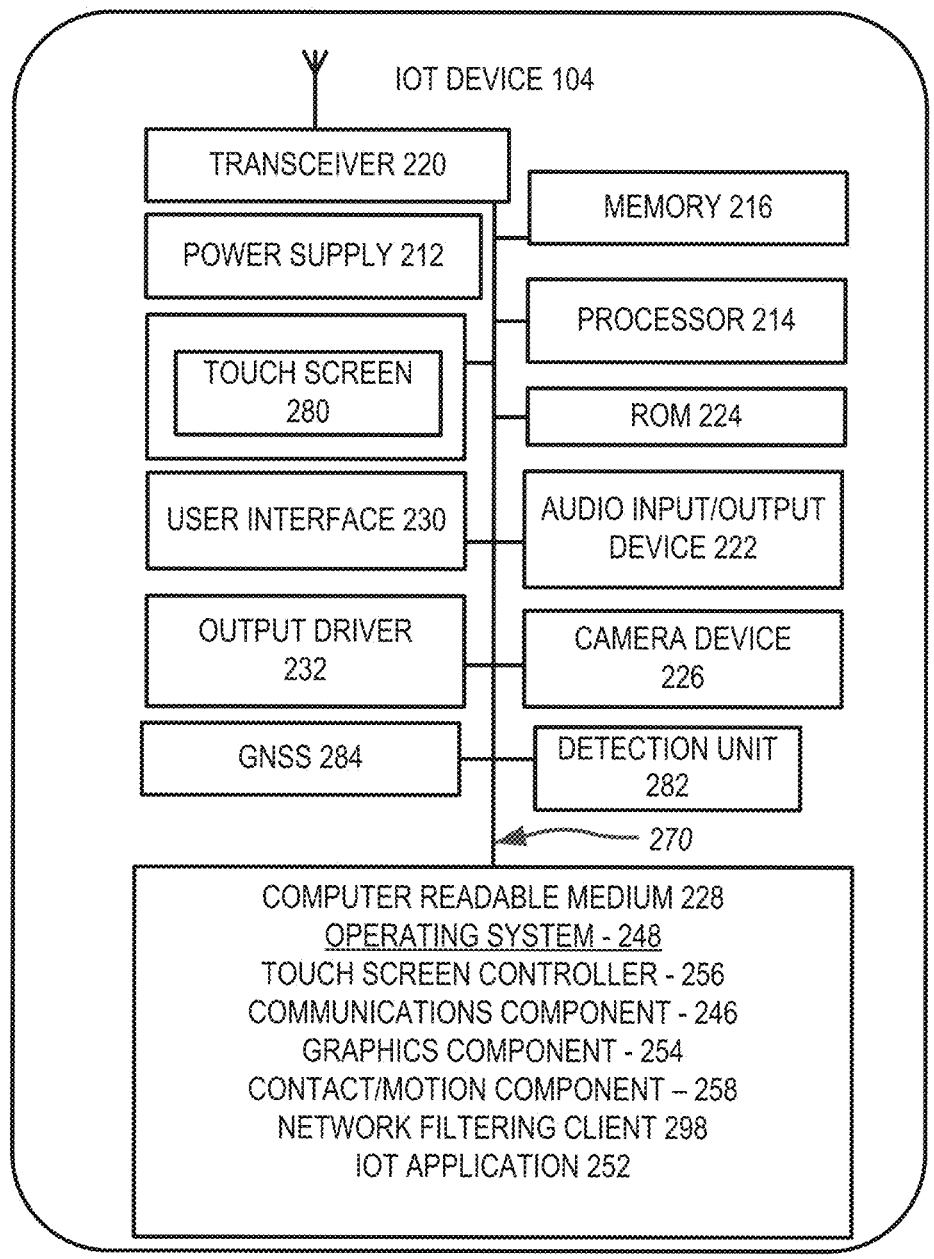
FIG. 2 illustrates details of an exemplary IoT device in accordance with aspects of the disclosure.

FIG. 2 shows the details of an exemplary IoT device in accordance with aspects of the disclosure.

The IoT device 104 may include a processor 214, a memory 216, and/or the like. The processor 214 may be a central processing unit, a chipset, a microprocessor, dedicated hardware, and/or the like configured to execute instructions including instructions related to software programs.

The IoT device 104 may further include in the memory 216 or separate from the memory 216, a computer readable memory 228, an operating system 248, a communication component 246, a contact/motion component 258, a touch-screen controller 256, a graphics component 254, a network filtering client 298, and/or the like. The operating system 248 together with the various components may provide software functionality for each of the components of the IoT device 104. The IoT device 104 may further include a read-only memory 224 (ROM) and a power supply 212 such as a battery or a wired connection to a power source.

The memory 216 may include a high-speed random-access memory. Also, the memory 216 may be a non-volatile memory, such as magnetic fixed disk storage, flash memory, and/or the like. The various components of the IoT device 104 may be connected through various communication lines including a data bus 270.

The network filtering client 298 may be pre-installed or post-installed on the plurality of IoT devices 104. In one aspect, the network filtering client 298 may be an application downloaded and installed in the plurality of IoT devices 104. In one aspect, the network filtering client 298 may be an application available through distribution platforms called app stores, such as the Apple App Store, Google Play, Windows Phone Store, BlackBerry App World, and the like.

The network filtering client 298 may filter usage of the plurality of IoT devices 104. In particular, the network filtering client 298 may receive data from the network filtering platform 196 for implementation of a filtering process. In one aspect, part of a network filtering process 300 and part of a network filtering process 400 may be implemented in the network filtering client 298 and other parts of the network filtering process 300 and parts of the network filtering process 400 may be implemented in the network filtering platform 196. Additionally, the network filtering platform 196 may send parameters for the filtering process implemented by the IoT device 104 and/or the network filtering client 298. Moreover, the network filtering client 298 may send notifications to the network filtering platform 196 and/or the like indicating that the filtering process is being implemented and may send a log of all blocked access. The network filtering client 298 may be configured to implement the further functionality as described in further detail below.

Additionally, the IoT device 104 may include an audio input/output device 222. The audio input/output device 222 may include speakers, speaker outputs, and/or the like, providing sound output; and may include microphones, microphone inputs, and/or the like, for receiving sound inputs. The audio input/output device 222 may include an analog to digital converter and a digital to audio converter for audio input and output functions respectively.

The IoT device 104 may include a transceiver 220 and the like. The IoT device 104 implementing the transceiver 220 may provide radio and signal processing as needed to access the wireless network 106 for services over a communication channel 164 as defined herein. The processor 214 and the transceiver 220 may be configured to process instruction functions, data transfer, IoT data, and/or the like and provide other services. In one aspect, the IoT device 104 may be configured to communicate over the wireless network 106 utilizing encryption; and the IoT cloud service 100 may be configured for decryption of data received over the wireless network 106. The processor 214 may provide the encryption and decryption functionality. In one aspect, the encryption may include a process of encoding a message, information, the IoT data, and/or the like in such a way that only authorized parties can access it and those who are not authorized cannot. In one aspect, the encryption may include an encryption scheme, the intended information or message, referred to as plaintext, may be encrypted using an encryption algorithm, which may be a cipher, generating ciphertext that can be read only if decrypted. In one aspect, the encryption scheme may use a pseudo-random encryption key generated by an algorithm. In symmetric-key schemes, the encryption and decryption keys may be the same. Communicating parties must have the same key in order to achieve secure communication. In one aspect, the encryption scheme may be a public-key encryption scheme where the encryption key is published for anyone to use and encrypt messages. However, only the receiving party has access to the decryption key that enables messages to be read.

In some aspects, the IoT device 104 may include a display 218, a user interface 230, and/or the like. The display 218 may be a liquid crystal display having a backlight to illuminate the various color liquid crystals to provide a colorful display. The user interface 230 may be any type of physical input having one or more buttons, switches, and the like and/or may be implemented as a touchscreen 280.

The touchscreen 280 of the disclosure may be implemented in the display 218 and may detect a presence and location of a touch of a user within the display area. For example, touching the display 218 of the IoT device 104 with a finger or hand. The touchscreen 280 may also sense other passive objects, such as a stylus.

In operation, the display 218 may display various objects associated with applications for execution by the processor 214. In this regard, a user may touch the display 218, and in particular the touchscreen 280, to interact with the objects. For example touching an object may execute an application in the processor 214 associated with the object that is stored in memory 216. Additionally or alternatively, touching an object may open a menu of options to be selected by the user. The display 218 may include a plurality of the objects for the user to interact with. Moreover, the display 218 may include a plurality of screens. The display 218 showing one screen at a time. The user may interact with the display 218 to move a screen into view on the display 218. Various objects may be located in the each of the screens.

The touchscreen 280 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, and/or the like.

The IoT device 104 may include a camera device 226. The camera device 226 can include one or more cameras to provide visual input. The camera device 226 can also capture video in combination with audio from a microphone of the audio input/output device 222. The camera device 226 may include a charge coupled device (CCD), CMOS image sensors, Back Side Illuminated CMOS, and/or the like. Images captured by the camera device 226 may be converted, transmitted, and stored in various formats including a JPEG file format, RAW feature format such as the Android (operating system) 5.0 Lollipop, and/or the like.

The IoT device 104 may include a detection unit 282. The detection unit 282 may include or connect to a number of sensors to detect a physical quantity. The detection unit 282 may be implemented by any one or more of accelerometers, gyroscopes, altitude sensors, temperature sensor, proximity sensor, IR sensor (infrared sensor), pressure sensor, light sensor, ultrasonic sensor, smoke sensor, gas sensor, alcohol sensor, touch sensor, color sensor, humidity sensor, tilt sensor, flow sensor, level sensor, electrical sensors, and/or the like. The detection unit 282 may further include analog-to-digital converters, filters, and the like to process the signals associated with any of the sensors. The detection unit 282 may generate IoT data.

The IoT device 104 may include an output driver device 232. The output driver device 232 may be configured to provide a drive signal to control, initiate, and/or the like a component associated with the IoT device 104 based on IoT data.

The computer readable memory 228 may be configured to store an IoT control application 252. For the purposes of this disclosure, the computer readable memory 228 stores computer data, which may include computer program code that may be executable by the processor 214 of the IoT device 104 in machine readable form. By way of example, and not limitation, the computer readable memory 228 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable memory 228 or machine readable medium, which may be incorporated into a computer program product.

According to another aspect of the disclosure, the IoT device 104 may estimate the location of the IoT device 104 based, at least in part, on a global navigation satellite system (GNSS 284). In another aspect, the wireless network 106 may implement location determination based on a specific cell in which the IoT device 104 connects. In yet another aspect, the wireless network 106 may obtain location determination based on triangulation with respect to a plurality of cells in which the IoT device 104 receives signals. In one aspect, the location of the IoT device 104 may be IoT data.

Figure 3:
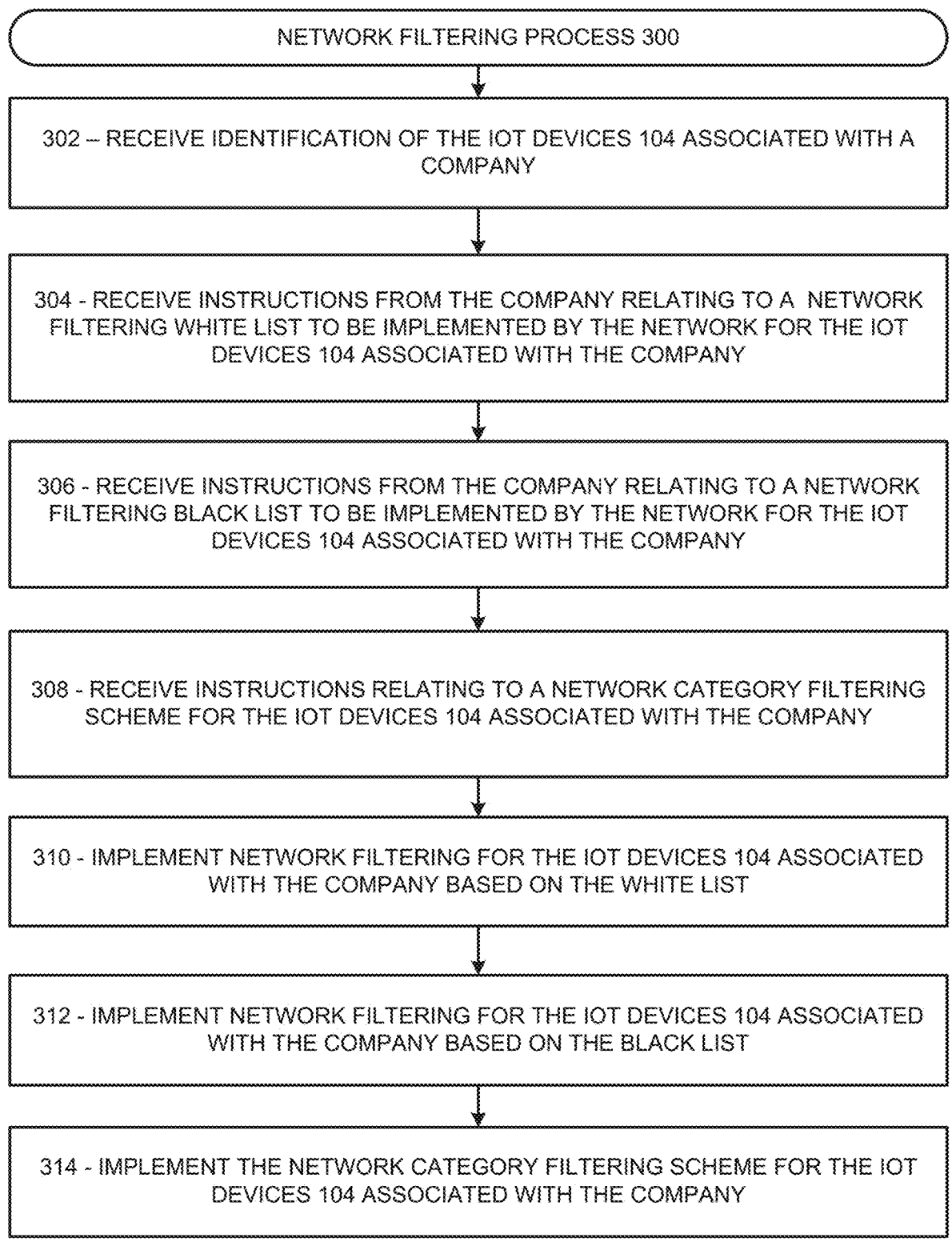
FIG. 3 shows network filtering processes in accordance with aspects of the disclosure.

FIG. 3 shows network filtering processes in accordance with aspects of the disclosure.

As described above, the network filtering client 298, the network filtering platform 196, and/or the like may operate to filter wireless usage of the IoT device 104. For brevity, the network filtering client 298, the network filtering platform 196, and/or the network filtering platform 196 will be referred to hereinafter as a filtering component. In this regard, the process and functionality described for the filtering component may be included in one or more of the network filtering client 298, the network filtering platform 196, and/or the network filtering platform 196.

The filtering component may include an aspect for the company (as defined by the disclosure) or a company IoT administrator (hereinafter company administrator) to set up the filtering component to be applied to the wireless service provided to the IoT devices 104. In particular, the filtering component may implement one or more processes that may include the network filtering process 300 in order to: identify the IoT devices 104 and/or particular wireless subscribers associated with a company (Box 302); receive instructions from a company relating to a network filtering white list to be implemented by the network for the IoT devices 104 and/or particular wireless subscribers associated with a company (Box 304); receive instructions (Box 306) from a company relating to a network filtering black list to be implemented by the network for the IoT devices 104 and/or particular wireless subscribers associated with a company; receive instructions (Box 308) relating to a network category filtering scheme for the IoT devices 104 and/or particular wireless subscribers associated with a company; implement network filtering (Box 310) for the IoT devices 104 and/or particular wireless subscribers associated with a company based on the white list; implement network filtering (Box 312) for the IoT devices 104 and/or particular wireless subscribers associated with a company based on the black list; and implement the network category filtering scheme (Box 314) for the IoT devices 104 and/or particular wireless subscribers associated with a company. It should be noted that not all processes need to be executed. For example, only the portions of the black list process may be implemented. On the other hand, only the portions of the white list process may be implemented.

In a particular aspect, the filtering component may receive identification (Box 302) of the particular ones of the IoT devices 104 by receiving identification information of the particular wireless subscribers and/or the IoT devices 104 from the company administrator. In particular, the information may include network-specific information as required by the network. Additionally, the filtering component may receive specific information in order to provide the MVNO and/or the MVNO cloud 198 the ability to positively identify the wireless subscriber and/or plurality of IoT devices 104. The network-specific information may include for example one or more of a phone number, an Integrated Circuit Card Identification (ICCID), Electronic Serial Number (ESN), International Mobile Equipment Identity (IMEI), International Mobile Subscriber Identity (IMSI), Local Area Identity (LAI), and/or the like. Of course other types of information are within the spirit and scope of the disclosure. In one aspect, the company administrator may simply provide the phone number of the plurality of IoT devices 104 in which the filtering component is to be applied. Once the filtering component receives the identification information, the identification information may be stored in a database associated with the filtering component.

In another aspect of the network filtering process 300, the filtering component may receive identification (Box 302) of the particular wireless subscribers and/or the IoT devices 104 by receiving identification information of the company from the company administrator. In this regard, when a company administrator logs into an account associated with the IoT devices 104, the filtering component may search a database for all IoT devices 104 associated with the company. Thereafter, the filtering component may receive identification information automatically and the identification information may be stored in a database associated with the filtering component. Accordingly, the IoT devices 104 of the company may be associated with the company, the company administrator, the company account, and/or the like in order for the various filtering processes, customized controls, and/or the like to be implemented and more easily controlled. For example, the IoT devices 104 of the company may be associated with the company account and may be modified as a group such that the network filtering process 300 and/or the network filtering process 400 implemented by all of the IoT devices 104 of the company may be simultaneously modified.

In Box 304 of the network filtering process 300, the filtering component may receive instructions from the company administrator relating to a network filtering white list to be implemented by the filtering component for the IoT devices 104 and/or particular wireless subscribers associated with a company. In this regard, the white list may be a series of valid web addresses that the IoT devices 104 may access. The valid web addresses may include a Uniform Resource Locator (URL), which may be a reference to a web resource that specifies its location on a computer network and a mechanism for retrieving the resource. A URL may be a specific type of Uniform Resource Identifier (URI). A URL may imply a means to access an indicated resource. URLs may reference web pages (http), file transfer (ftp), email (mailto), database access (JDBC), Internet Protocol version 4 (IPv4) addresses, Internet Protocol version 6 (IPv6) addresses, and many other identifiers. Once the filtering component receives the white list information, the white list information may be stored in a database associated with the filtering component. The white list may be a list or register of URLs that are being provided access. Alternatively, the white list may be a list or range of Internet Protocol version 4 (IPv4) addresses, Internet Protocol version 6 (IPv6) addresses, or other specific identifiers.

In Box 306 of the network filtering process 300, the filtering component may receive instructions from the company administrator relating to a network filtering black list to be implemented by the filtering component for the IoT devices 104. In this regard, the black list may be a series of valid web addresses that the IoT devices 104 may not access. Once the filtering component receives the black list information, the black list information may be stored in a database associated with the filtering component. The black list may be a list or register of URLs, for one reason or another, are being denied. Alternatively, the black list may be a list or range of Internet Protocol version 4 (IPv4) addresses, Internet Protocol version 6 (IPv6) addresses, or other specific identifiers.

In Box 308 of the network filtering process 300, the filtering component may receive instructions from the company administrator relating to a network category filtering to be implemented by the filtering component for the IoT devices 104 associated with a company.

The category filtering may apply at least one filtering category scheme, such as an inclusive or exclusive filter, and at least one set of filtering elements, such as a list of allowed or excluded categories based on a category of filtering e.g. low filtering, medium filtering, high filtering, or the like. For example, the at least one filtering category scheme may include excluding social media websites, excluding video streaming websites, and/or the like. Accordingly, a request to a social media website would not meet the category filtering. The category filtering scheme may include exclusion of other types of websites as well. Alternatively the category filtering may apply at least one filtering category scheme, such as an inclusive or exclusive filter, and at least one set of filtering elements, such as a range of allowed or excluded Internet Protocol version 4 (IPv4) addresses or Internet Protocol version 6 (IPv6) addresses. For example a Company could elect to block all Internet Protocol addresses that reside outside of the United States.

With reference to Box 310, Box 312, and Box 314 of the network filtering process 300 illustrated in FIG. 3, once the IoT devices 104 have been identified and stored, the black list has been identified and stored, the white list identified and stored, and/or the category filtering scheme identified and stored, the filtering component may implement network filtering for the IoT devices 104 associated with a company based on the white list, category filtering scheme, and/or black list as described in further detail below.

Figure 4:
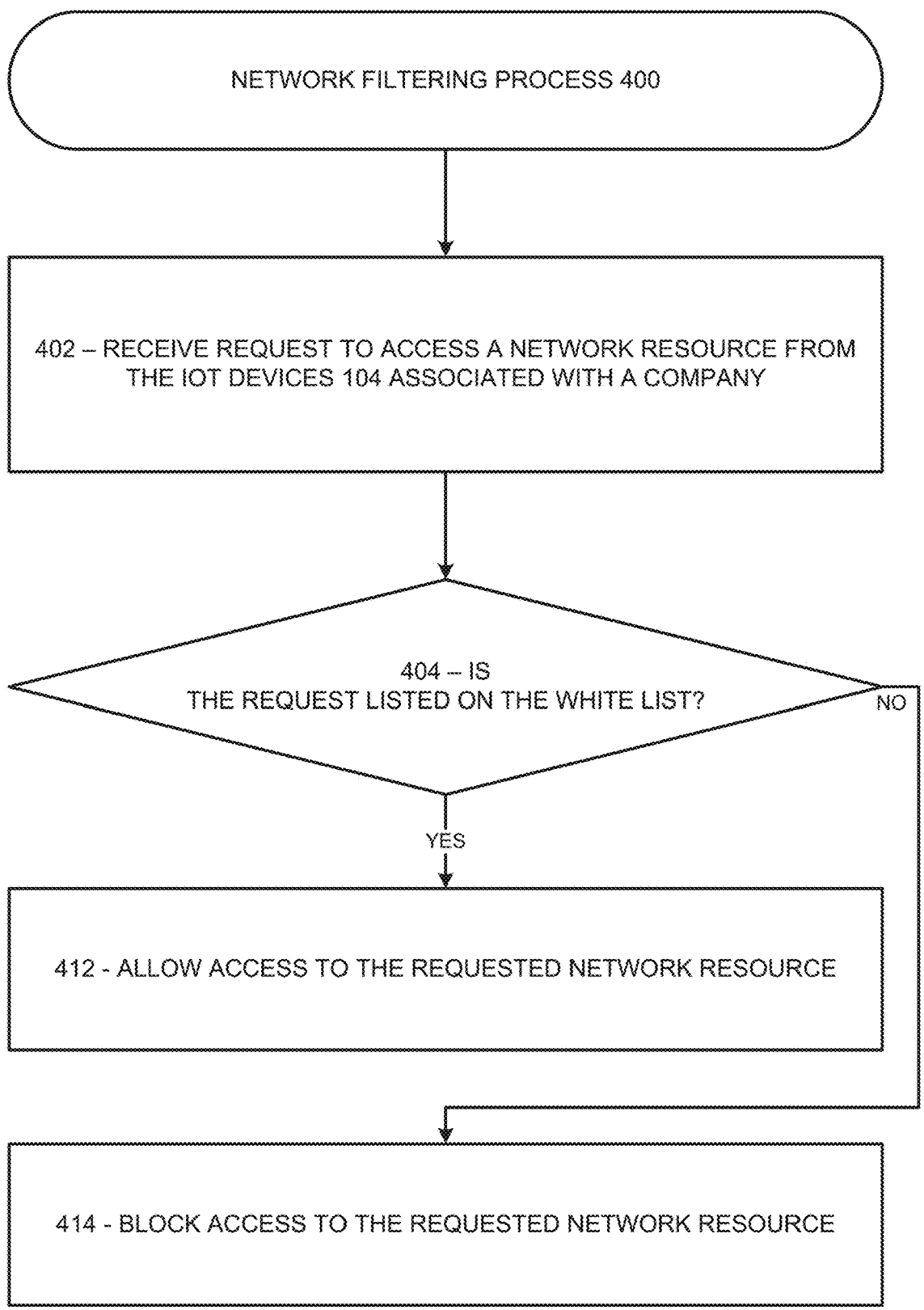
FIG. 4 shows further network filtering processes in accordance with aspects of the disclosure.

FIG. 4 shows further network filtering processes in accordance with aspects of the disclosure.

Figure 5:
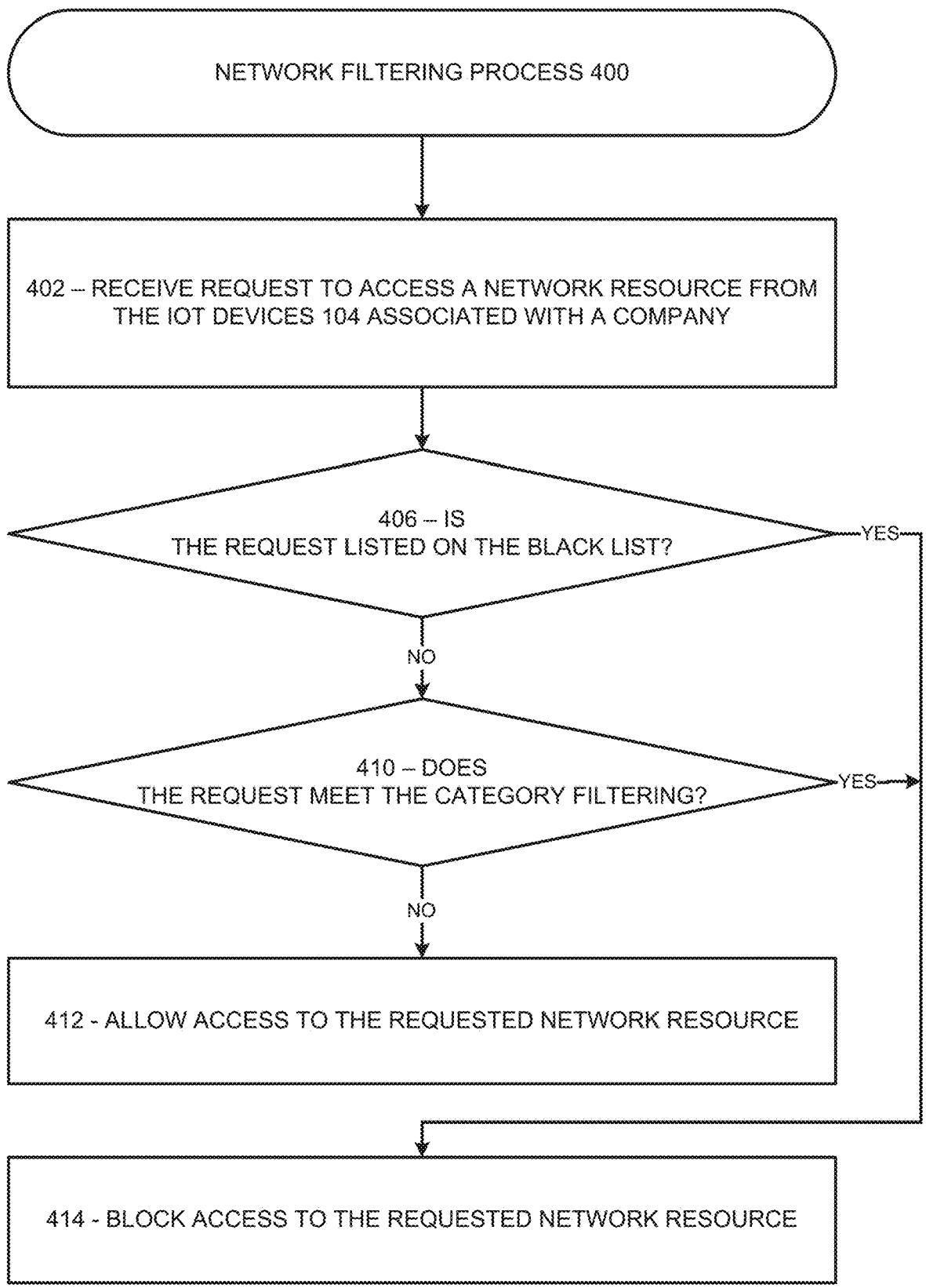
FIG. 5 shows further network filtering processes in accordance with aspects of the disclosure.

FIG. 5 shows further network filtering processes in accordance with aspects of the disclosure.

In particular, FIG. 4 and FIG. 5 illustrate a network filtering process 400 implemented by the filtering component.

In box 402, the filtering component may receive a request to access a network resource from the IoT devices 104 associated with a company. The network resource may be a URL or the like as described above.

Next, in box 404 of FIG. 4, the filtering component may analyze the requested network resource and determine whether the request is listed on the white list. If the requested resource is listed on the white list, then the process advances to box 412 where the IoT devices 104 may be allowed access to the requested network resource.

On the other hand, if the requested resource is not listed on the white list the process advances to box 414. In box 414, access to the requested network resource is blocked. The IoT devices 104 may further receive an indication that that the requested network resource is blocked.

Next, in box 406 of FIG. 5, the filtering component may analyze the requested network resource and determine whether the request is listed on the black list. If the requested resource is not listed on the black list, then the process advances to box 410.

On the other hand, if the requested resource is listed on the black list, the process advances to box 414. In box 414, access to the requested network resource is blocked. The IoT devices 104 may further receive an indication that that the requested network resource is blocked.

Next, in box 410, the filtering component may analyze the requested network resource and determine whether the request meets a category filtering. The category filtering may apply at least one filtering category scheme, such as an inclusive or exclusive filter, and at least one set of filtering elements, such as a list of allowed or excluded categories based on a category of filtering e.g. low filtering medium filtering are high filtering. If the requested resource meets the category filtering, then the process advances to box 412 where the user of the plurality of IoT devices 104 may be allowed access to the requested network resource.

On the other hand, if the requested resource meets the category filtering the process advances to box 414. In box 414, access to the requested network resource is blocked. The user of the plurality of IoT devices 104 may further receive an indication that that the requested network resource is blocked.

Finally, the process may flow to box 412 where the IoT devices 104 may be allowed access to the requested network resource.

Figure 6:
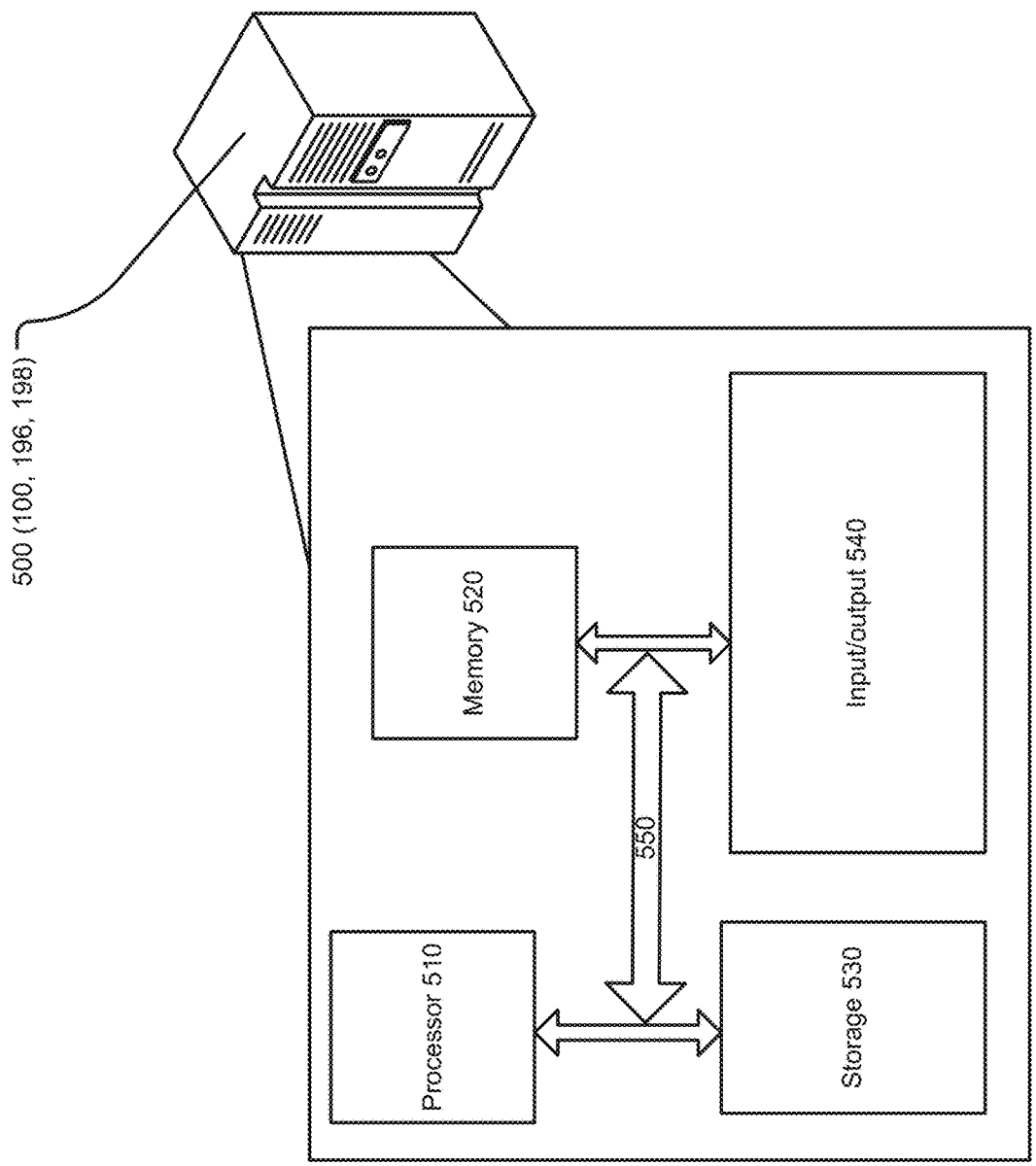
FIG. 6 shows a schematic diagram of an exemplary computer system in accordance with aspects of the disclosure.

FIG. 6 shows a schematic diagram of an exemplary computer system in accordance with aspects of the disclosure.

In particular, FIG. 6 illustrates a computer system 500 that can be used to implement the network filtering platform 196, the MVNO cloud 198, the IoT cloud service 100 and/or like. In particular, the computer system 500 may operate to provide some or all of the filtering component functionality as described herein. The computer system 500 may include a processor 510, a memory 520, a storage device 530, an input/output device 540, and/or the like. Each of the processor 510, the memory 520, the storage device 530, the input/output device 540 and/or the like can, for example, be interconnected using a system bus 550. The processor 510 may be capable of processing instructions for execution of the network filtering process 300 and/or the network filtering process 400 within the computer system 500. In one implementation, the processor 510 is a single-threaded processor. In another implementation, the processor 510 may be a multi-threaded processor. The processor 510 may be capable of processing instructions stored in the memory 520 or on the storage device 530 to provide communications to the plurality of IoT devices 104. In one aspect, the storage device 530 may log all blocked access to the IoT devices 104. In some aspects, a parallel processing set of computer systems 500 connected over a network may be employed, clustered into one or more server centers.

The memory 520 may store information within the computer system 500. In one implementation, the memory 520 is a computer-readable medium. In one implementation, the memory 520 is a volatile memory unit. In another implementation, the memory 520 is a non-volatile memory unit. The storage device 530 may be capable of providing mass storage for the computer system 500. In one implementation, the storage device 530 is a computer-readable medium. In various different implementations, the storage device 530 can, for example, include a hard disk device, an optical disk device, or some other large capacity storage device. The input/output device 540 provides input/output operations for the computer system 500.

In one aspect, the memory 520 and/or the storage device 530 may store software for implementing the network filtering process 300 and/or the network filtering process 400. Additionally, the processor 510 may operate in conjunction with the memory 520 and/or the storage device 530 in order to execute the network filtering process 300 and/or the network filtering process 400.

Figure 7:
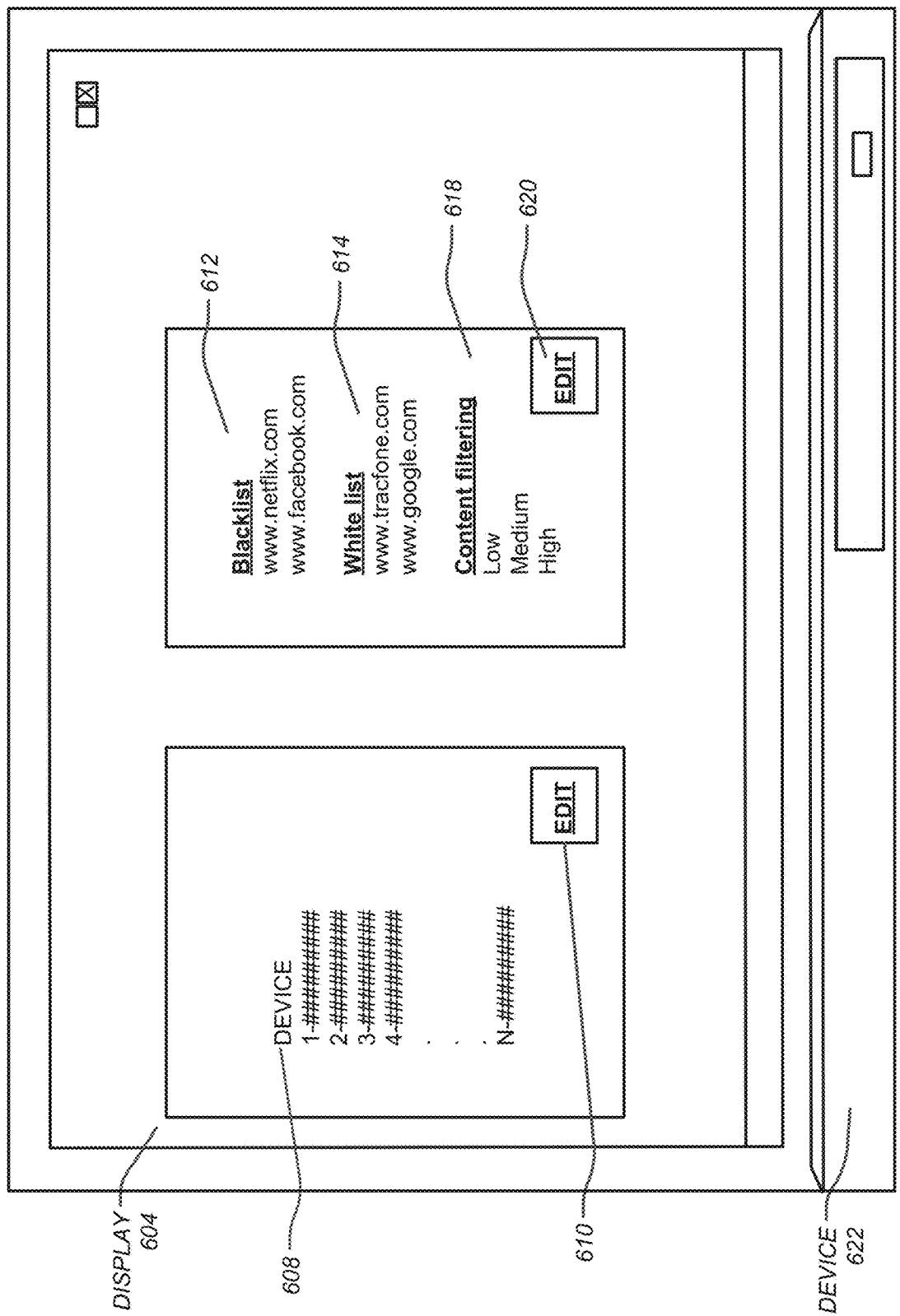
FIG. 7 shows an exemplary computer system graphical user interface in accordance with aspects of the disclosure.

FIG. 7 shows an exemplary computer system graphical user interface in accordance with aspects of the disclosure.

In particular, FIG. 7 shows a device 622 such as a personal computer, laptop, and/or the like. The device 622 may have a display that provides the graphical user interface. The device 622 may be implemented by the company administrator to implement, modify, and/or the like the network filtering process 300 and/or the network filtering process 400. The company administrator may utilize a web browser to connect to the network filtering platform 196, the MVNO cloud 198, the IoT cloud service 100, and/or the like which may include logon identification and logon password functionality. Once the company administrator has gained access to the network filtering platform 196, the MVNO cloud 198, the IoT cloud service 100, and/or the like they may review, add, remove, and/or the like users, particular ones of the IoT devices 104 and/or the like (devices 608) by interacting with the webpage such as by clicking an edit button 610 consistent with Box 302 of the network filtering process 300.

As further shown in FIG. 7, the company administrator may interact with the device 622 and web browser to review, add, remove, white list URLs 614 by interacting with the webpage such as by clicking an edit button 620 consistent with Box 304 of the network filtering process 300. In this regard, the company administrator has indicated a wireless provider website and a search website to be included on the white list.

As further shown in FIG. 7, the company administrator may interact with the device 622 and web browser to review, add, remove, blacklist URLs 612 by interacting with the webpage such as by clicking an edit button 620 consistent with Box 306 of the network filtering process 300. In this regard, the company administrator has indicated a video streaming website and a social media website to be included on the black list.

Finally, the company administrator may interact with the device 622 and web browser to review and revise the level of content filtering 618 by interacting with the webpage such as by clicking an edit button 620, clicking radio buttons, and/or the like consistent with the Box 308 of the network filtering process 300. In this regard, as shown in FIG. 7, the administrator has selected a medium level of content filtering.

It should be noted that FIG. 7 is merely exemplary. The device 622 may connect to the network filtering platform 196 in other ways, directly, indirectly, and/or the like. Moreover, the particular layout and information provided on the display 604 may be provided in other ways as well.

Referring back to FIG. 1, in various aspects one or more of the plurality of wireless networks 106 may include the radio access network (RAN) 162. The RADIO ACCESS NETWORK (RAN) 162 may be implemented as part of a mobile telecommunication system of the wireless network 106. The RADIO ACCESS NETWORK (RAN) 162 may implement a radio access technology. The RADIO ACCESS NETWORK (RAN) 162 may reside between the plurality of IoT devices 104 and the IoT cloud service 100 and provide a connection with a core network (CN).

One or more of the plurality of wireless networks 106 may include the Mobility Management Entity (MME) 114. The Mobility Management Entity (MME) 114 may function as a key control-node. The Mobility Management Entity (MME) 114 may be responsible for idle mode of the IoT device 104 as well as paging and tagging procedures including retransmissions. The Mobility Management Entity (MME) 114 may be involved in the bearer activation/deactivation process and may also responsible for choosing a Signaling Gateway (SGW) 110 for the IoT device 104 at the initial attach and at a time of intra-LTE handover involving Core Network (CN) node relocation. The Mobility Management Entity (MME) 114 may be responsible for authenticating the IoT device 104 by interacting with the home subscriber server (HSS) 122. Non-Access Stratum (NAS) signaling may terminate at the Mobility Management Entity (MME) 114 and may also be responsible for generation and allocation of temporary identities to the IoT device 104. The Mobility Management Entity (MME) 114 may check the authorization of the IoT device 104 to camp on the service provider's Public Land Mobile Network (PLMN) and may enforce roaming restrictions on the IoT device 104. The Mobility Management Entity (MME) 114 may be a termination point in the wireless network 106 for ciphering/integrity protection for NAS signaling and may handle the security key management. The Mobility Management Entity (MME) 114 may also provide a control plane function for mobility between LTE and 2G/3G access networks with an S3 interface terminating at the Mobility Management Entity (MME) 114 from the Serving GPRS Support Node (SGSN). The Mobility Management Entity (MME) 114 may also terminate an S6a interface towards the home subscriber server (HSS) 122 for roaming IoT devices 104.

The Signaling Gateway (SGW) 110 may be implemented as a network component responsible for transferring signaling messages (i.e. information related to call establishment, billing, location, short messages, address conversion, and other services) between Common Channel Signaling (CCS) nodes that communicate using different protocols and transports.

One or more of the plurality of wireless networks 106 may include the home subscriber server (HSS) 122, or user profile server function (UPSF). The home subscriber server (HSS) 122 may be a master user database that supports IP Multimedia Core Network Subsystem (IMS) network entities. It may contain the subscription-related information (subscriber profiles), performs authentication and authorization of the user, and can provide information about the subscriber's location and IP information. In other aspects, the wireless networks 106 may be implemented without the home subscriber server (HSS) 122.

One or more of the plurality of wireless networks 106 may include the public data network (PDN) gateway (PDN GW) 112. The public data network (PDN) gateway (PDN GW) 112 may contain devices such as protocol translators, impedance matching devices, rate converters, fault isolators, or signal translators as necessary to provide system interoperability. The public data network (PDN) gateway (PDN GW) 112 may also require the establishment of mutually acceptable administrative procedures between networks.

The PDN may be a circuit-switched or packet-switched network that can transmit data in digital form. The PDN may provide any of X.25, frame relay, cell relay (ATM), or the like services. Access to a PDN generally includes a guaranteed bandwidth, known as the committed information rate (CIR).

The wireless network 106 may include an S5/S8 interface that may be used within the Evolved Packet Core (EPC) for LTE. The S5 interface may provide user plane tunneling and tunnel management between a serving GW and the public data network (PDN) gateway (PDN GW) 112. It may be used for Serving GW relocation due to IoT device 104 mobility and if the serving GW needs to connect to a non-collocated implementation of the public data network (PDN) gateway (PDN GW) 112 for the required PDN connectivity.

The wireless network 106 may further include the Online Charging System (OCS) 124. The Online Charging System (OCS) 124 may be a system allowing a communications service provider to charge their customers, in real time, based on service usage. The Online Charging System (OCS) 124 may communicate with the billing component 128.

The wireless network 106 may further include a Policy and Charging Rules Function (PCRF) 126. The Policy and Charging Rules Function (PCRF) 126 may be a software node designated in real-time to determine policy rules in a multimedia network. In some aspects, the Policy and Charging Rules Function (PCRF) 126 may be a policy tool. The Policy and Charging Rules Function (PCRF) 126 may be a component that operates at the network core and accesses subscriber databases and other specialized functions, such as a charging system, in a centralized manner. The Policy and Charging Rules Function (PCRF) 126 may be part of the network architecture that aggregates information to and from the wireless network 106, operational support systems, and other sources (such as portals) in real time, supporting the creation of rules and then automatically making policy decisions for each subscriber active on the network. The Policy and Charging Rules Function (PCRF) 126 may communicate with a billing component 128.

The Customer Relationship Management (CRM) 130 may be an integrated management information system that is used to schedule, plan, and control the activities for the wireless network 106. The Customer Relationship Management (CRM) 130 may include hardware, software, and networking tools to improve customer tracking and communication.

In some aspects, the wireless network 106 may include an S8 interface. The S8 interface may provide an inter-PLMN reference point providing user and control plane between the Serving GW in the Visited Public Land Mobile Network (VPLMN) 132 and the public data network (PDN) gateway (PDN GW) 112 and the home Public Land Mobile Network (PLMN) 120. S8 is the inter PLMN variant of S5. In some aspects, the wireless network 106 may include Gx signaling. The Gx signaling may provide an on-line policy interface between the Gateway GPRS Support Node (GGSN) and the charging rules function (CRF). It may be used for provisioning service data flow based on charging rules. The Gx signaling may utilize the diameter protocol. In some aspects, the wireless network 106 may include Gy signaling. The Gy signaling may be an on-line charging interface between the Gateway GPRS Support Node (GGSN) and the Online Charging System (OCS) 124. The Gy signaling may utilize the diameter protocol.

In some aspects, the plurality of wireless networks 106 may include a Mobile services Switching Center (MSC) that may perform the switching of calls and that may include a Visitor Location Register (VLR). The plurality of wireless networks 106 may also include a Base Transceiver Station (BTS) and a Base Station Controller (BSC). The base transceiver station houses the radio transceivers that define a cell and handle the radio-link protocols with the plurality of IoT devices 104. The base station controller manages the radio resources for one or more base transceiver stations. The base station controller is the connection between the plurality of IoT devices 104 and the Mobile service Switching Center (MSC).

A Home Location Register (HLR) and the VLR together with the MSC, provide the call-routing and roaming capabilities. The HLR contains all the administrative information of each subscriber registered in the plurality of wireless networks 106, along with the current location of the plurality of IoT devices 104. The above is an exemplary implementation of the plurality of wireless networks 106. Other types of networks utilizing other types of protocols may be implemented as well and are contemplated by the disclosure.

Referring back to FIG. 1, the IoT cloud service 100 may include, may implement, may connect, and/or the like an IoT platform. In a particular aspect, all data exchanged between the plurality of IoT devices 104 and the third-party enterprise 102 may be monitored by the IoT cloud service 100. In a particular aspect, all data exchanged between the plurality of IoT devices 104 and the third-party enterprise 102 may be transmitted through the IoT cloud service 100.

Figure 8:
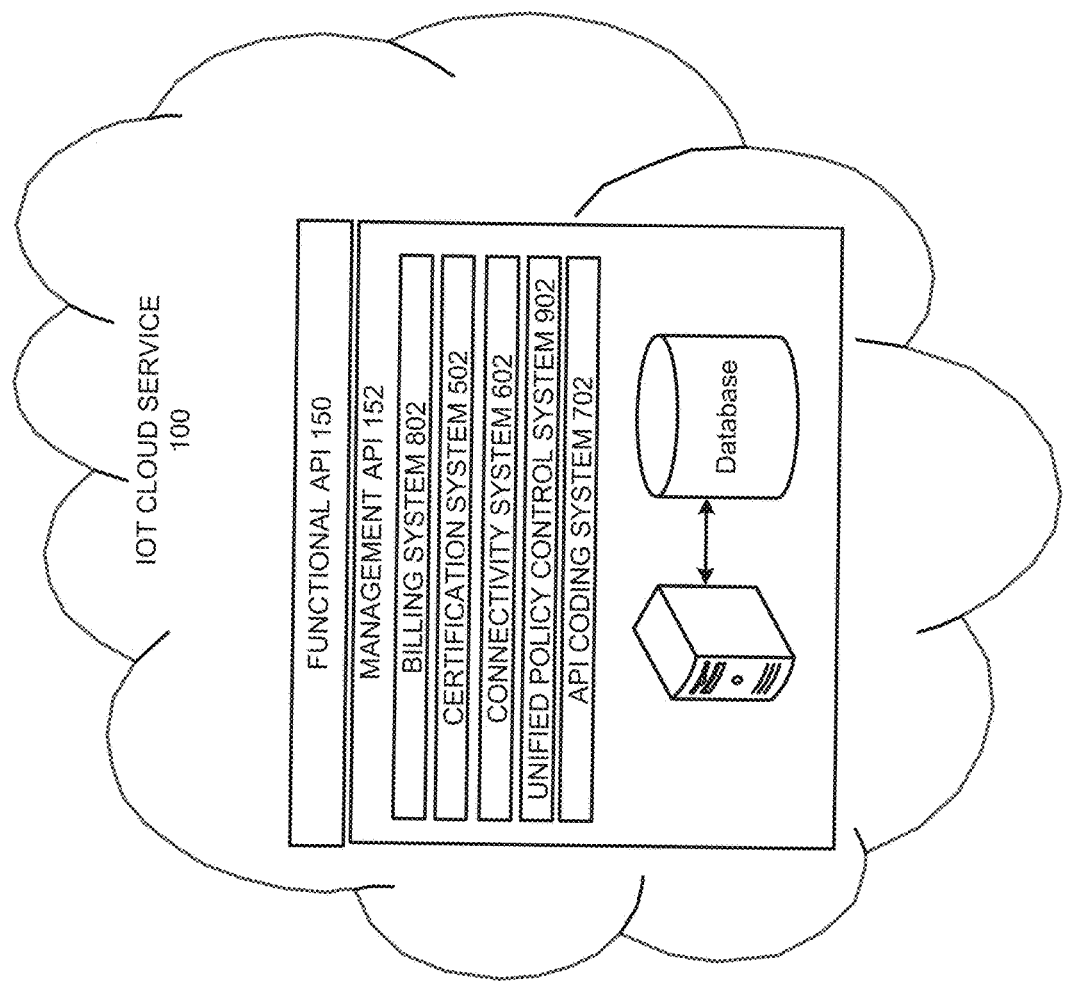
FIG. 8 further illustrates details of an exemplary IoT cloud service in accordance with aspects of the disclosure.

FIG. 8 further illustrates details of an exemplary IoT cloud service in accordance with aspects of the disclosure.

The IoT cloud service 100 may include a functional application programming interface (API) system 150 and a management application programming interface (API) system 152. The management application programming interface (API) system 152 may include, connect, implement, and the like a certification system 502, a connectivity system 602, an API coding system 702, a billing system 802, and a unified policy control system 902.

In some aspects of the disclosure, one or more of the management application programming interface (API) system 152, the certification system 502, the connectivity system 602, the API coding system 702, the billing system 802, and the unified policy control system 902 may include a web portal. The web portal may be a specially designed website that brings information from diverse sources. In some aspects, each information source gets a dedicated area on the page for displaying information (a portlet). In some aspects, the portal may include mashups and intranet "dashboards." The portal may use an application programming interface (API). The portal may provide a way for enterprises and organizations with access control, modification, procedures, and the like for multiple applications and databases. The features available may be restricted to an authorized and authenticated user (employee, member).

The certification system 502 may be implemented by the management application programming interface (API) system 152 to ensure certification of the IoT devices 104 within the wireless network 106. The connectivity system 602 may be implemented by the management application programming interface (API) system 152 to ensure connectivity between the IoT devices 104, the wireless network 106, and the third-party enterprise 102. The API coding system 702 may be implemented by the management application programming interface (API) system 152 to ensure proper API coding for implementation of the IoT devices 104 in the wireless network 106 and in conjunction with the third-party enterprise 102. The billing system 802 may be implemented by the management application programming interface (API) system 152 to ensure proper billing of the wireless services of the IoT devices 104 in the wireless network 106 as well as the billing associated with operation of the functional application programming interface (API) system 150. The unified policy control system 902 may be implemented by the management application programming interface (API) system 152 to ensure proper policy and control of the IoT devices 104 in the wireless network 106.

In various aspects, the management application programming interface (API) system 152 may include a processor. The processor may be implemented as a PC, CPU, server, and the like. The processor may interact with, connect to, and support the certification system 502, the connectivity system 602, the API coding system 702, the billing system 802, and the unified policy control system 902.

In various aspects, the management application programming interface (API) system 152 may include a database. The database may include digital storage for implementation of the management application programming interface (API) system 152. The database may also provide storage for the certification system 502, the connectivity system 602, the API coding system 702, the billing system 802, and the unified policy control system 902. In one aspect, the database may utilize and implement blockchain technology. In this regard, the database may take the received data as a list of records, that may be defined as blocks. In particular, each of the blocks of the data may be linked using cryptography. Each block may contain a cryptographic hash of the previous block, a timestamp, and the data. The blockchain may be managed by the database adhering to a protocol for internode communication and validation of new blocks. In some aspects, the resulting blockchain of the data may form a blockchain ledger that may not be easily modified, changed, and the like to ensure a higher level of security and data confidence. In one aspect, the block chain may be implemented as a public blockchain, a private blockchain, a consortium blockchain, and/or the like.

In one or more aspects, the management application programming interface (API) system 152 and/or the functional application programming interface (API) system 150 may be configured to run commands for the IoT devices 104 on Windows, macOS, and Linux. These commands may allow the creation and management of the IoT devices 104, certificates, rules, and policies. In one or more aspects, the management application programming interface (API) system 152 and/or the functional application programming interface (API) system 150 may be configured to build IoT applications for the IoT devices 104 using HTTP or HTTPS requests. These API actions allow the program creation and management of the IoT devices 104, certificates, rules, and policies. In one or more aspects, the management application programming interface (API) system 152 and/or the functional application programming interface (API) system 150 may be configured to build IoT applications using language-specific APIs. The associated SDKs may wrap the HTTP/HTTPS API and allow programming in any of the supported languages. In one or more aspects, the management application programming interface (API) system 152 and/or the functional application programming interface (API) system 150 may be configured to build applications that run on the IoT devices 104 that send messages to and receive messages from the management application programming interface (API) system 152, the functional application programming interface (API) system 150, and/or the IoT devices 104.

The certification system 502 may include, connect, implement, and the like the management application programming interface (API) system 152, the connectivity system 602, the API coding system 702, the billing system 802, and the unified policy control system 902.

The certification system 502 may be implemented by the management application programming interface (API) system 152 to ensure certification of the IoT devices 104 within the wireless network 106. In particular, the certification system 502 may facilitate integration of the IoT devices 104 to their ecosystem. In some aspects, the certification processes ensure the IoT devices 104 are properly integrated (interfaces, data exchange, and logic) and are working with the IoT platform 160. In some aspects, the certification system 502 may be implemented by the management application programming interface (API) system 152 to ensure certification of the IoT devices 104 across multiple wireless carriers and/or multiple wireless networks 106 to facilitate integration of the IoT devices 104 to their ecosystem and to ensure proper integration with the multiple wireless carriers and/or the multiple wireless networks 106 with the with the IoT platform 160.

In various aspects, the certification system 502 may include a processor. The processor may be implemented as a PC, CPU, server, and the like. The processor may interact with, connect to, and support the management application programming interface (API) system 152, the connectivity system 602, the API coding system 702, the billing system 802, and the unified policy control system 902.

In various aspects, the certification system 502 may include a database. The database may include digital storage for implementation of the certification system 502. The database may also provide storage for the management application programming interface (API) system 152, the connectivity system 602, the API coding system 702, the billing system 802, and the unified policy control system 902.

The connectivity system 602 may include, connect, implement, and the like the management application programming interface (API) system 152, the certification system 502, the API coding system 702, the billing system 802, and the unified policy control system 902.

The connectivity system 602 may be implemented by the management application programming interface (API) system 152 to ensure connectivity between the IoT devices 104, the wireless network 106, and the third-party enterprise 102. In particular, the connectivity system 602 ensures that the IoT devices 104 are connecting to the wireless network 106 and they are properly exchanging data across the wireless network 106 as well as exchanging data with the third-party enterprise 102. In some aspects, the connectivity system 602 ensures that the IoT devices 104 are connecting to multiple wireless carriers and/or multiple wireless networks 106 and they are properly exchanging data across the multiple wireless networks 106 as well as exchanging data with the third-party enterprise 102.

In various aspects, the connectivity system 602 may include a processor. The processor may be implemented as a PC, CPU, server, and the like. The processor may interact with, connect to, and support the management application programming interface (API) system 152, the certification system 502, the API coding system 702, the billing system 802, and the unified policy control system 902.

In various aspects, the connectivity system 602 may include a database. The database may include digital storage for implementation of the connectivity system 602. The database may also provide storage for the management application programming interface (API) system 152, the certification system 502, the API coding system 702, the billing system 802, and the unified policy control system 902.

The API coding system 702 may include, connect, implement, and the like the management application programming interface (API) system 152, the connectivity system 602, certification system 502, the billing system 802, and the unified policy control system 902.

The API coding system 702 may be implemented by the management application programming interface (API) system 152 to ensure proper API coding for implementation of the IoT devices 104 in the wireless network 106 and in conjunction with the third-party enterprise 102. In particular, the API coding system 702 ensures the API coding subroutine definitions, protocols, tools, and the like and associated methods of communication between various software components are properly operating. In some aspects, the APIs may include a specification that can take many forms, but may include specifications for routines, data structures, object classes, variables, or remote calls. In some aspects, the API coding system 702 may be implemented by the management application programming interface (API) system 152 to ensure proper API coding for implementation of the IoT devices 104 in multiple wireless carriers and/or multiple wireless networks 106 and in conjunction with the third-party enterprise 102.

In various aspects, the API coding system 702 may include a processor. The processor may be implemented as a PC, CPU, server, and the like. The processor may interact with, connect to, and support the management application programming interface (API) system 152, the certification system 502, the connectivity system 602, the billing system 802, and the unified policy control system 902.

In various aspects, the API coding system 702 may include a database. The database may include digital storage for implementation of the API coding system 702. The database may also provide storage for the management application programming interface (API) system 152, the certification system 502, the connectivity system 602, the billing system 802, and the unified policy control system 902.

The billing system 802 may include, connect, implement, and the like the management application programming interface (API) system 152, the connectivity system 602, certification system 502, the API coding system 702, and the unified policy control system 902.

The billing system 802 may be implemented by the management application programming interface (API) system 152 to ensure proper billing of the wireless services of the IoT devices 104 in the wireless network 106 as well as the billing associated with operation of the functional application programming interface (API) system 150. In particular, the billing system 802 may operate to gather billing information from the home Public Land Mobile Network (PLMN) 120, the Online Charging System (OCS) 124, the Policy and Charging Rules Function (PCRF) 126, the public data network (PDN) gateway (PDN GW) 112 and/or the like as well as the functional application programming interface (API) system 150. In some aspects, the billing system 802 may be implemented by the management application programming interface (API) system 152 to ensure proper billing of the wireless services of the IoT devices 104 in multiple wireless carriers and/or multiple wireless networks 106 as well as the billing associated with operation of the functional application programming interface (API) system 150.

In various aspects, the billing system 802 may include a processor. The processor may be implemented as a PC, CPU, server, and the like. The processor may interact with, connect to, and support the management application programming interface (API) system 152, the certification system 502, the connectivity system 602, the API coding system 702, and the unified policy control system 902.

In various aspects, the billing system 802 may include a database. The database may include digital storage for implementation of the billing system 802. The database may also provide storage for the management application programming interface (API) system 152, the certification system 502, the connectivity system 602, the API coding system 702, and the unified policy control system 902.

The unified policy control system 902 may include, connect, implement, and the like the management application programming interface (API) system 152, the connectivity system 602, certification system 502, the API coding system 702, and the billing system 802.

The unified policy control system 902 may be implemented by the management application programming interface (API) system 152 to ensure proper policy and control of the IoT devices 104 in the wireless network 106. In this regard, the unified policy control system 902 may include a policy stored in a database 904. Moreover, the unified policy control system 902 may apply the policy in interactions between the third-party enterprise 102, the functional application programming interface (API) system 150, and/or the wireless network 106. In particular aspects, the unified policy control system 902 may be implemented by the management application programming interface (API) system 152 to ensure proper policy and control of the IoT devices 104 in multiple wireless carriers and/or multiple wireless networks 106.

In various aspects, the unified policy control system 902 may include a processor. The processor may be implemented as a PC, CPU, server, and the like. The processor may interact with, connect to, and support the management application programming interface (API) system 152, the certification system 502, the connectivity system 602, the API coding system 702, and the billing system 802.

In various aspects, the unified policy control system 902 may include a database. The database may include digital storage for implementation of the unified policy control system 902. The database may also provide storage for the management application programming interface (API) system 152, the certification system 502, the connectivity system 602, the API coding system 702, and the billing system 802.

Referring back to FIG. 1, in various aspects the IoT cloud service 100 may include a functional application programming interface (API) system 150. In one aspect, the IoT cloud service 100 may include a management application programming interface (API) system 152. In one aspect, the IoT cloud service 100 may include the management application programming interface (API) system 152 and the functional application programming interface (API) system 150.

In some aspects, the APIs of the functional application programming interface (API) system 150 and the management application programming interface (API) system 152 may include a set of subroutine definitions, protocols, tools, and the like. These may include a set of clearly defined methods of communication between various software components. The APIs may be for a web-based system, operating system, database system, computer hardware, software library, or the like. In some aspects, the APIs may include a specification that can take many forms, but may include specifications for routines, data structures, object classes, variables, or remote calls. The APIs may be implemented by POSIX, Windows API, ASPI (Advanced SCSI Programming Interface), and the like.

The functional application programming interface (API) system 150 may implement or connect to an on-demand cloud computing platform. For example, the functional application programming interface (API) system 150 may implement Amazon Web Services (AWS). AWS is a subsidiary of Amazon.com that provides on-demand cloud computing platforms to individuals, companies, and governments, on a paid subscription basis. The functional application programming interface (API) system 150 may allow subscribers to have at their disposal a full-fledged virtual cluster of computers, available all the time, through the internet. The functional application programming interface (API) system 150 may implement virtual computers that may include a number of the attributes of a real computer including a central processing unit (CPU), graphics processing unit (GPU), Random-access memory (RAM), hard-disk storage, solid-state drive (SSD) storage, and/or the like. The functional application programming interface (API) system 150 may include a choice of operating systems and networking. The functional application programming interface (API) system 150 may have pre-loaded application software such as web servers, databases, CRM, etc. The functional application programming interface (API) system 150 may also virtualize its console I/O (keyboard, display, and mouse), allowing subscribers to connect to their system using a browser. The browser acts as a window into the virtual computer, letting subscribers log-in, configure, and use their virtual systems just as they would a real physical computer.

The management application programming interface (API) system 152 may aggregate, process, control, and the like multiple functions between the third-party enterprise 102, the IoT device 104 and the functional application programming interface (API) system 150. In this regard, certain aspects of the management application programming interface (API) system 152 may implement certification functions, connectivity functions, API coding functions, billing functions, unified policy control functions, and the like.

Accordingly, the disclosure provides companies the ability to control functionality and/or limit functionality of mobile devices and/or wireless services to increase efficiency and productivity, reduce costs, and/or reduce potential hazards. This ability is especially unique with mobile devices as they operate outside the company's network. The typical company has great control over their own network resources. Hence, the unique approach to the network filtering scheme disclosed allows a company to maintain greater control of devices of the company provided wireless service which would have previously been impossible to implement.

The following are a number of nonlimiting EXAMPLES of aspects of the disclosure. One EXAMPLE includes EXAMPLE 1. A process of filtering a wireless service provided to at least one wireless device from a wireless network for an individual of a company, the process includes: implementing a filtering server in at least one of a mobile virtual network operator cloud and a mobile network operator implementing the wireless network; receiving identification of at least one wireless device in the filtering server from an administrator of a company; receiving filtering instructions from the administrator in the filtering server; receiving a request in the wireless network for an internet resource from at least one wireless device; comparing the request for the internet resource to the filtering instructions with the filtering server to determine whether the request for an internet resource is allowable in view of the filtering instructions or not allowed based on the filtering instructions; providing the internet resource to the wireless device with the filtering server if the request for an internet resource is allowable based on the filtering instructions; and denying the internet resource to the wireless device with the filtering server if the request for an internet resource is not allowed based on the filtering instructions and sending an indication to the at least one wireless device that the request for an internet resource is not allowed, where the filtering instructions includes at least one of the following: a white list of internet resources, a blacklist of internet resources, and categories of internet resources and a degree of content filtering based on said categories; where the receiving identification of the at least one wireless device in the filtering server from the administrator includes receiving company identification information through a webpage generated by the filtering server; and where the filtering server is configured to search a database based on the company identification information to generate the identification of the at least one wireless device utilized by the company.

The above-noted EXAMPLE may further include any one or a combination of more than one of the following EXAMPLES: 2. The process of filtering a wireless service according to EXAMPLE 1 or any other of the EXAMPLES listed herein, where the filtering instructions includes the white list of internet resources, the blacklist of internet resources, and the categories of internet resources and the degree of content filtering based on said categories; and where the at least one wireless device includes at least one Internet of things (IoT) device. 3. The process of filtering a wireless service according to EXAMPLE 1 or any other of the EXAMPLES listed herein, where the filtering server is implemented in the wireless network by the mobile network operator; and where the administrator accesses the webpage generated by the filtering server using a thin client. 4. The process of filtering a wireless service according to EXAMPLE 1 or any other of the EXAMPLES listed herein where the filtering server is at least partially implemented in part in the mobile virtual network operator cloud; where the filtering server is further configured for provisioning, metering, and consolidating information for the at least one wireless device; and where the implementing the filtering server further includes implementing the filtering server as a Software as a Service (SaaS) implemented as a software licensing and delivery model licensed on a subscription basis. 5. The process of filtering a wireless service according to EXAMPLE 1 or any other of the EXAMPLES listed herein, where the filtering server includes a first filtering server implemented in the mobile virtual network operator cloud separate from the wireless network; where the first filtering server is further configured for provisioning, metering, and consolidating information for the at least one wireless device; and where the filtering server includes a second filtering server implemented by the mobile network operator in the wireless network. 6. The process of filtering a wireless service according to EXAMPLE 1 or any other of the EXAMPLES listed herein, where the filtering instructions includes the white list of internet resources; where the filtering server is implemented in the mobile virtual network operator cloud separate from the wireless network; and where the filtering server is further configured for provisioning, metering, and consolidating information for the at least one wireless device. 7. The process of filtering a wireless service according to EXAMPLE 1 or any other of the EXAMPLES listed herein where the filtering server is at least partially implemented in the mobile virtual network operator cloud; where the filtering server is further configured for provisioning, metering, and consolidating information for the at least one wireless device; where the filtering instructions includes the white list of internet resources, the blacklist of internet resources, and the categories of internet resources and the degree of content filtering based on said categories; where the receiving filtering instructions from the administrator in the filtering server includes receiving the filtering instructions through the webpage generated by the filtering server; and where the receiving filtering instructions includes reviewing and revising the white list of internet resources, reviewing and revising the blacklist of internet resources, and reviewing and revising the categories of internet resources and the degree of content filtering based on said categories. 8. The process of filtering a wireless service according to EXAMPLE 1 or any other of the EXAMPLES listed herein, where the filtering instructions includes the blacklist of internet resources; and where the filtering server is implemented in the mobile virtual network operator cloud separate from the wireless network. 9. The process of filtering a wireless service according to EXAMPLE 1 or any other of the EXAMPLES listed herein, where the receiving filtering instructions from the administrator in the filtering server includes receiving the filtering instructions through a webpage generated by the filtering server; and where the receiving filtering instructions includes reviewing and revising the white list of internet resources, reviewing and revising the blacklist of internet resources, and reviewing and revising the categories of internet resources and the degree of content filtering based on said categories. 10. The process of filtering a wireless service according to EXAMPLE 1 or any other of the EXAMPLES listed herein, where the filtering instructions includes the white list of internet resources, the blacklist of internet resources, and the categories of internet resources and the degree of content filtering based on said categories; where the filtering server is further configured for provisioning, metering, and consolidating information for the at least one wireless device; where the filtering server is implemented in the mobile virtual network operator cloud separate from the wireless network; where the receiving filtering instructions from the administrator in the filtering server includes receiving the filtering instructions through the webpage generated by the filtering server; where the administrator accesses the webpage generated by the filtering server using a thin client; and where the receiving filtering instructions includes reviewing and revising the white list of internet resources, reviewing and revising the blacklist of internet resources, and reviewing and revising the categories of internet resources and the degree of content filtering based on said categories.

One EXAMPLE includes EXAMPLE 11. A wireless network system filtering a wireless service provided to at least one wireless device from a wireless network for an individual of a company includes: a filtering server configured to receive identification of at least one wireless device from an administrator of a company; the filtering server further configured to receive filtering instructions from the administrator; the filtering server further configured to receive a request for an internet resource from at least one wireless device; the filtering server further configured to compare the request for the internet resource to the filtering instructions to determine whether the request for the internet resource is allowable in view of the filtering instructions or not allowed based on the filtering instructions; the filtering server further configured to provide the internet resource to the wireless device if the request for the internet resource is allowable based on the filtering instructions; and the filtering server further configured to deny the internet resource to the wireless device if the request for the internet resource is not allowed based on the filtering instructions and send an indication to the at least one wireless device that the request for an internet resource is not allowed, where the filtering server is implemented in at least one of a mobile virtual network operator cloud and a mobile network operator implementing the wireless network; where the filtering instructions includes at least one of the following: a white list of internet resources, a blacklist of internet resources, categories of internet resources and a degree of content filtering based on said categories; where the receiving identification of the at least one wireless device in the filtering server from the administrator includes receiving company identification information through a webpage generated by the filtering server, and where the filtering server is configured to search a database based on the company identification information to generate the identification of the at least one wireless device associated with the company.

The above-noted EXAMPLE may further include any one or a combination of more than one of the following EXAMPLES: 12. The wireless network system according to EXAMPLE 11 or any other of the EXAMPLES listed herein, where the filtering instructions includes the white list of internet resources, the blacklist of internet resources, the categories of internet resources and the degree of content filtering based on said categories; and where the at least one wireless device includes at least one Internet of things (IoT) device. 13. The wireless network system according to EXAMPLE 11 or any other of the EXAMPLES listed herein, where the filtering server is implemented in the wireless network by the mobile network operator; and where the administrator accesses the webpage generated by the filtering server using a thin client. 14. The wireless network system according to EXAMPLE 11 or any other of the EXAMPLES listed herein where the filtering server is at least partially implemented in the mobile virtual network operator cloud; and where the filtering server is further configured for provisioning, metering, and consolidating information for the at least one wireless device. 15. The wireless network system according to EXAMPLE 11 or any other of the EXAMPLES listed herein, where the filtering server includes a first filtering server implemented in the mobile virtual network operator cloud; where the first filtering server is further configured for provisioning, metering, and consolidating information for the at least one wireless device; and where the filtering server includes a second filtering server implemented by the mobile network operator in the wireless network. 16. The wireless network system according to EXAMPLE 11 or any other of the EXAMPLES listed herein, where the filtering instructions includes the white list of internet resources; where the filtering server is implemented in the mobile virtual network operator cloud separate from the wireless network; and where the filtering server is further configured for provisioning, metering, and consolidating information for the at least one wireless device. 17. The wireless network system according to EXAMPLE 11 or any other of the EXAMPLES listed herein where the filtering server is at least partially implemented in the mobile virtual network operator cloud where the filtering instructions includes the white list of internet resources, the blacklist of internet resources, and the categories of internet resources and the degree of content filtering based on said categories; where the filtering server is further configured for provisioning, metering, and consolidating information for the at least one wireless device; where the receiving filtering instructions from the administrator in the filtering server includes receiving the filtering instructions through the webpage generated by the filtering server; and where the receiving filtering instructions includes reviewing and revising the white list of internet resources, reviewing and revising the blacklist of internet resources, and reviewing and revising the categories of internet resources and the degree of content filtering based on said categories. 18. The wireless network system according to EXAMPLE 11 or any other of the EXAMPLES listed herein, where the implementing the filtering server further includes implementing the filtering server as a Software as a Service (SaaS) implemented as a software licensing and delivery model licensed on a subscription basis; where the filtering instructions includes the blacklist of internet resources; and where the filtering server is implemented in a third party wireless network separate from the wireless network. 19. The wireless network system according to EXAMPLE 11 or any other of the EXAMPLES listed herein, where the receiving filtering instructions from the administrator in the filtering server includes receiving the filtering instructions through a webpage generated by the filtering server; and where the receiving filtering instructions includes reviewing and revising the white list of internet resources, reviewing and revising the blacklist of internet resources, and reviewing and revising the categories of internet resources and the degree of content filtering based on said categories. 20. The wireless network system according to EXAMPLE 11 or any other of the EXAMPLES listed herein, where the filtering instructions includes the white list of internet resources, the blacklist of internet resources, the categories of internet resources and the degree of content filtering based on said categories; where the filtering server is implemented in the wireless network by the mobile network operator; where the filtering server is further configured for provisioning, metering, and consolidating information for the at least one wireless device; where the receiving filtering instructions from the administrator in the filtering server includes receiving the filtering instructions through the webpage generated by the filtering server; where the administrator accesses the webpage generated by the filtering server using a thin client; where the receiving filtering instructions includes reviewing and revising the white list of internet resources, reviewing and revising the blacklist of internet resources, and reviewing and revising the categories of internet resources and the degree of content filtering based on said categories.

For the purposes of this disclosure a computer readable medium stores computer data, which data can include computer program code that is executable by a processor of the SIM or mobile device, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

In an aspect, the disclosure may be web-based. For example, a server may operate a web application to allow the disclosure to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and Universal Mobile Telecommunications System (UMTS)/High Speed Packet Access (HSPA) network technologies, 4G ($4^{th}$ generation mobile networks or $4^{th}$ generation wireless systems), Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Further in accordance with various aspects of the disclosure, the methods described herein are intended for operation with dedicated hardware implementations including, but not limited to, PCs, PDAs, SIM cards, semiconductors, application specific integrated circuits (ASIC), programmable logic arrays, cloud computing devices, and other hardware devices constructed to implement the methods described herein.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

Accordingly, the disclosure has set forth an IoT cloud service 100 that provides increased efficiency, connectivity, control, proficiency, and the like. The IoT cloud service 100 ensures that the third-party enterprise 102 has an improved and more reliable experience as it relates to the various implementations of the IoT devices 104. Moreover, the disclosure has set forth an IoT cloud service 100 that provides increased efficiency, connectivity, control, proficiency, and the like with respect to multiple wireless carriers and/or multiple wireless networks 106. The IoT cloud service 100 ensures that the third-party enterprise 102 has an improved and more reliable experience as it relates to various implementation of the IoT devices 104 with respect to multiple wireless carriers and/or multiple wireless networks 106.

For the purposes of this disclosure a computer readable medium stores computer data, which data can include computer program code that is executable by a processor in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm, or module may reside as one or any combination or set of codes and/or instructions on a computer readable medium or machine readable medium, which may be incorporated into a computer program product.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (W-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Further in accordance with various aspects of the disclosure, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

The IoT control application 252 and/or the network filtering client 298 described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

The following acronyms used herein will be defined as follows:

BSC—Base Station Controller
BTS—Base Transceiver Station
CDMA—Code-Division Multiple Access
ESN—Electronic Serial Number
GSM—Global System for Mobile communication
HLR—Home Location Register
ICCID—Integrated Circuit Card Identification
IMEI—International Mobile Equipment Identity
IMSI—International Mobile Subscriber Identity
LAI—Local Area Identity
LTE—Long Term Evolution
MSC—Mobile services Switching Center
MVNO—Mobile Virtual Network Operator
SMS—Short Message Service
UICC—Universal Integrated Circuit Card or SIM
UMTS—Universal Mobile Telecommunications Service
VLR—Visitor Location Register While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The disclosure includes any and all aspects of the following claims.

The invention claimed is:

1. A process of filtering a wireless service provided to at least one wireless device from a wireless network for an individual of a company, the process comprising:
    searching a company database comprising company device identification information to determine an identity of at least one wireless device associated with the company, wherein determining the identity includes receiving company device identification information through a webpage generated by a filtering server, and wherein the at least one wireless device includes at least one Internet of Things (IOT) device;
    receiving filtering instructions, from an administrator of the company, in the at the filtering server, the filtering instructions comprising at least one of: (i) a white list of internet resources comprising at least one uniform resource identifier (URL) that the IoT device is allowed to access, (ii) a blacklist of internet resources comprising at least one URL that the IoT device is not allowed to access, and (iii) categories of internet resources and a degree of content filtering based on the categories of internet resources;
    receiving a request in the wireless network for an internet resource from at least one wireless device;
    comparing the request for the internet resource to the filtering instructions with the filtering server to determine whether the request for an internet resource is allowable in view of the filtering instructions or not allowed based on the filtering instructions;
    providing the internet resource to at least one wireless device via the filtering server if the request for an internet resource is allowable based on the filtering instructions; and
    denying the internet resource to at least one wireless device via the filtering server if the request for an internet resource is not allowed based on the filtering instructions and sending an indication to the at least one wireless device that the request for an internet resource is not allowed.

2. The process of filtering a wireless service according to claim 1,
    wherein the administrator accesses the webpage generated by the filtering server using a thin client.

3. The process of filtering a wireless service according to claim 1,
    wherein the filtering server is implemented in at least one of: (i) a mobile virtual network operator cloud; (ii) one or more wireless networks; (iii) a home public land mobile network; and (iv) a third-party enterprise.

4. The process of filtering a wireless service according to claim 1,
    wherein the filtering server is at least partially implemented in part in a mobile virtual network operator cloud, the filtering server being configured for provisioning, metering, and consolidating information for the at least one wireless device.

5. The process of filtering a wireless service according to claim 4,
    wherein the filtering server comprises:
        a first filtering server implemented in the mobile virtual network operator cloud separate from the wireless network, the first filtering server being configured for provisioning, metering and consolidating information for the at least one wireless device; and
        a second filtering server implemented by a mobile network operator in the wireless network.

6. The process of filtering a wireless service according to claim 1, wherein the filtering server is implemented as a Software as a Service (SaaS) comprising a software licensing and delivery model licensed on a subscription basis.

7. The process of filtering a wireless service according to claim 1, wherein receiving filtering instructions from the administrator in the filtering server comprises receiving the filtering instructions through the webpage generated by the filtering server.

8. The process of filtering a wireless service according to claim 1, wherein the administrator accesses the webpage generated by the filtering server using a thin client.

9. The process of filtering a wireless service according to claim 1, wherein the white list of internet resources includes a list or register of URLs that the IoT device is allowed to access, and wherein the black list of internet resources includes a list or register of URLs that the IoT device is not allowed to access.

10. A wireless network system, for filtering a wireless service provided to at least one wireless device from a wireless network for an individual of a company, the wireless network system comprising:
a filtering server configured to:
search a company database comprising company device identification information to determine an identity of at least one wireless device associated with the company, wherein determining the identity includes receiving company device identification information through a webpage generated by the filtering server, and wherein the at least one wireless device includes at least one Internet of Things (IOT) device;
receive filtering instructions, from an administrator of the company, the filtering instructions comprising at least one of: (i) a white list of internet resources comprising at least one uniform resource locator (URL) that the IoT device is allowed to access, (ii) a black list of internet resources comprising at least one URL that the IoT device is not allowed to access, and (iii) categories of internet resources and a degree of content filtering based on the categories of internet resources;
receive a request for an internet resource from at least one wireless device;
compare the request for the internet resource to the filtering instructions to determine whether the request for the internet resource is allowable in view of the filtering instructions or not allowed based on the filtering instructions;
provide the internet resource to at least one wireless device if the request for the internet resource is allowable based on the filtering instructions; and
deny the internet resource to at least one wireless device if the request for the internet resource is not allowed based on the filtering instructions and send an indication to the at least one wireless device that the request for an internet resource is not allowed.

11. The wireless network system according to claim 10, wherein the administrator accesses the webpage generated by the filtering server using a thin client.

12. The wireless network system according to claim 10, wherein the filtering server is implemented in at least one of: (i) a mobile virtual network operator cloud; (ii) one or more wireless networks; (iii) a home public land mobile network; and (iv) a third-party enterprise.

13. The wireless network system according to claim 10, wherein the filtering server is at least partially implemented in a mobile virtual network operator cloud, the filtering server being configured for provisioning, metering, and consolidating information for the at least one wireless device.

14. The wireless network system according to claim 13, wherein the filtering server comprises:
a first filtering server implemented in the mobile virtual network operator cloud, the first filtering server being configured for provisioning, metering and consolidating information from the at least one wireless device; and
a second filtering server implemented by a mobile network operator in the wireless network.

15. The wireless network system according to claim 10, wherein the filtering server further is implemented as a Software as a Service (Saas) comprising a software licensing and delivery model licensed on a subscription basis.

16. The wireless network system according to claim 14, wherein receiving filtering instructions from the administrator in the filtering server comprises receiving the filtering instructions through the webpage generated by the filtering server.

17. The wireless network system according to claim 10, wherein the filtering server is implemented in a third party wireless network separate from the wireless network.

18. The wireless network system according to claim 12, wherein receiving filtering instructions from the administrator in the filtering server comprises receiving the filtering instructions through a webpage generated by the filtering server.

19. The wireless network system according to claim 10, wherein the white list of internet resources includes a list or register of URLs that the IoT device is allowed to access, and wherein the black list of internet resources includes a list or register of URLs that the IoT device is not allowed to access.

* * * * *